United States Patent [19]

McMillan

[11] Patent Number: 5,943,111
[45] Date of Patent: Aug. 24, 1999

[54] LAYERED SUPERLATTICE FERROELECTRIC LIQUID CRYSTAL DISPLAY

[75] Inventor: Larry D. McMillan, Colorado Springs, Colo.

[73] Assignees: Symetrix Corporation, Colorado Springs, Colo.; Matsushita Electronics Corporation, Japan

[21] Appl. No.: 09/094,086

[22] Filed: Jun. 9, 1998

[51] Int. Cl.$^6$ .................................................. C09K 19/02
[52] U.S. Cl. .................................................. 349/171
[58] Field of Search ............................................ 349/171

[56] References Cited

U.S. PATENT DOCUMENTS

| | | | |
|---|---|---|---|
| 4,021,798 | 5/1977 | Kojima et al. | 340/324 M |
| 5,453,661 | 9/1995 | Auciello et al. | 315/1 |
| 5,508,590 | 4/1996 | Sampayan et al. | 315/169.1 |
| 5,635,949 | 6/1997 | Shiratsuki et al. | 345/94 |

OTHER PUBLICATIONS

O. Auciello, M.A. Ray, D. Palmer, J. Duarte, G.E. McGuire, and D. Temple; "Low voltage emission from $Pb(Zr_xTi_{1-x})O_3$–based thin film cathodes"; *Appl. Phys. Lett.* 66 (*17*); Apr. 24, 1995; pp. 2183–2185, inclusive.

G. Rosenman, D. Shur, Kh. Garb, and R. Cohen; "Polarization switching in ferroelectric cathodes"; *J. Appl. Phys.* 82(2); Jul. 15, 1997; pp. 772–778, inclusive.

G. Rosenman, D. Shur, and a. Skliar; "Ferroelectric electron emission flat panel display"; *J. Appl. Phys.* 79(9); May 1, 1997; pp. 7401–7403, inclusive.

*Primary Examiner*—William L. Sikes
*Assistant Examiner*—Robert J. Hollingshead
*Attorney, Agent, or Firm*—Duft, Graziano & Forest, P.C.

[57] ABSTRACT

A thin film of ferroelectric layered superlattice material in a flat panel display device is energized to selectively influence the display image. In one embodiment, a voltage pulse causes the layered superlattice material to emit electrons that impinge upon a phosphor, causing the phosphor to emit light. In another embodiment, an electric potential creates a remanent polarization in the layered superlattice material, which exerts an electric field in liquid crystal layer, thereby influencing the transmissivity of light through the liquid crystal. The layered superlattice material is a metal oxide formed using a special liquid precursor containing an alkoxycarboxylate. The thin film of layered superlattice material is formed using a spin-on technique and low-temperature heat treating. The thin film thickness is preferably in the range 500–1400 Å so that polarizability and transparency of the thin film is enhanced.

22 Claims, 10 Drawing Sheets

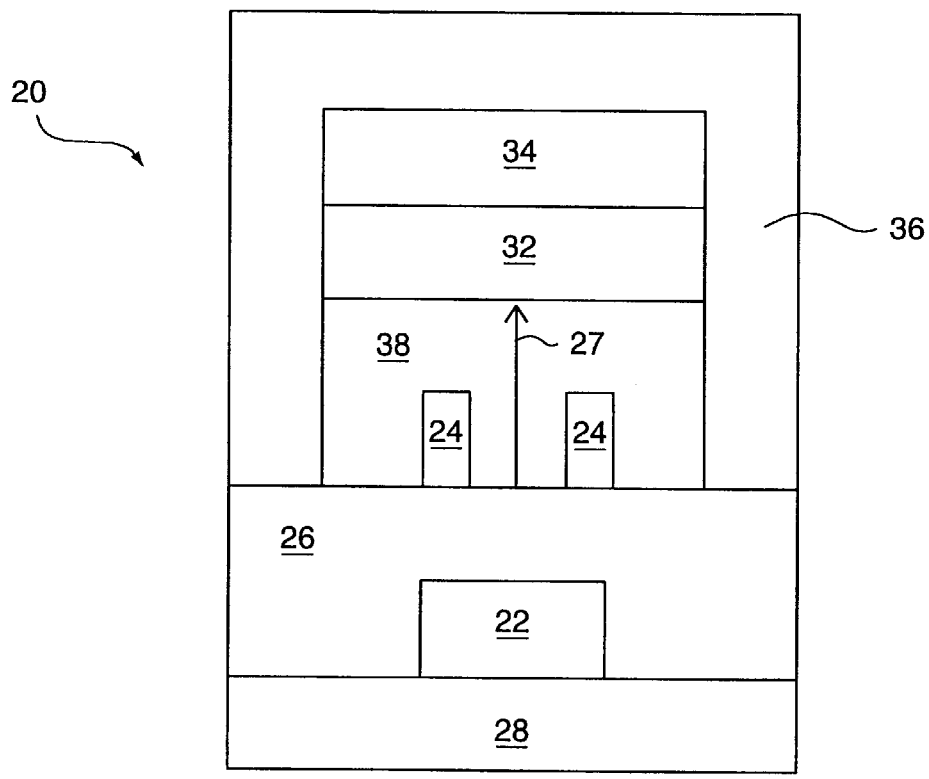
FIG. 2
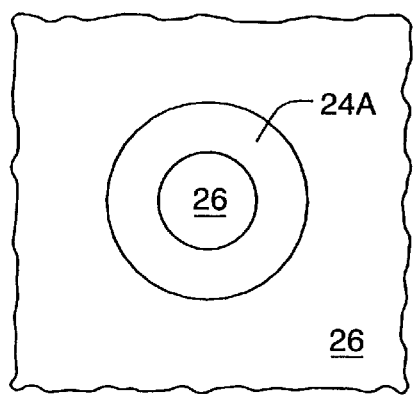 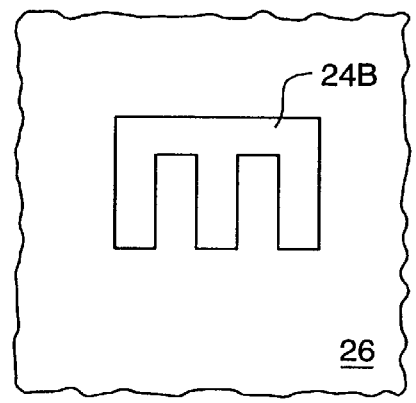
FIG. 3          FIG. 4

LAYERED SUPERLATTICE FERROELECTRIC LIQUID CRYSTAL DISPLAY

BACKGROUND OF THE INVENTION

1. Field of the Invention

The invention relates to ferroelectric optical display systems, in particular to flat panel display systems containing ferroelectric layered superlattice material.

2. Statement of the Problem

One broad category of flat panel display systems comprises a luminescent, or phosphor, layer that is energized to produce visible light. A phosphor is a luminescent material that converts part of the absorbed primary energy into emitted luminescent radiation. (The term "phosphor", as used herein, includes any material that converts energy from an external excitation and, by means of the phenomenon of phosphorescence or fluorescence, converts such energy into visible light. The terms "luminescent" and "phosphor" to describe a material or structural element are used here synonymously.)

For example, in an electroluminescent (EL) display, an electric field is applied across the luminescent layer in sufficient magnitude to cause avalanche breakdown of the phosphor. The light generated by recombination of electron-hole pairs can be tuned in wavelength by the addition of various impurity ions to the phosphor. As in virtually all flat panel display (FPD) devices, the display panel is formatted in an X-Y matrix of pixels. The drive circuitry supports the application of individual voltage differences between two electrode layers at each pixel location. 20 Unfortunately, the voltage required to trigger light emission from the luminescent layer in a thin-film EL device is as high as 200–250 V, and this requires that the driving circuits serving as switching elements should also be capable of withstanding such high voltage. The manufacture of such high-voltage devices is expensive. Furthermore, it is desirable that flat panel displays operate at the voltage level of many integrated circuit devices, that is, in the 3–10 volt range.

Flat panel field emission displays (FEDs) are also known. A field emission display typically comprises a flat vacuum cell with a matrix of microscopic field emitter cathode tips formed on the back plate of the cell, and a phosphor-coated anode at the front plate of the cell. The field emitter tips emit electrons upon application of appropriate voltages. The emitted electrons are directed to strike the luminescent layer with sufficient beam current intensity and Kinetic energy to cause the luminescent layer to generate visible light.

An advantage of displays with phosphor layers is that backlighting of the display is thereby eliminated. Backlighting can be impractical because the color and intensity of the light is delivered to the display unmodified, and the system must modify it to produce an optical image. One typical way to include color in a backlighted display is to pass light through a color filter. But, the filter absorbs up to 70 percent of the incident light, resulting in inefficiency or low intensity. Similarly, methods forming an image by controlling the transmissivity of light through the panel also result in inefficiency. An advantage of FED systems, and phosphoremission systems in general, is that the luminescent material generates the required image intensity based on the energy impinging the material without significant losses. Thus, displays with high brightness can be built. Unfortunately, FEDs typically require tens to hundreds of volts for electron emission, making it difficult to use these displays in many applications. Also, the electron field emitter tips typically need to be surrounded by a very high vacuum, at least $10^{-5}$ Torr, and often as high as $10^{-8}$–$10^{-9}$ in order to prevent degradation of the tips. Such high vacuums are difficult to maintain in the small volume enclosing field emitter tips. Furthermore, FEDs cannot be fabricated in "plane-to-plane" geometry.

It is known that ferroelectric materials can emit electrons when subjected to polarization switching. Ferroelectrics have the property of spontaneous polarization along a polarization axis. The material remains neutral internally as the end of each dipole is paired with the opposite end of the next dipole along that polar axis. At any boundary with a normal component to this axis, the dipoles are unpaired and a material- dependent bound charge will exist. As a consequence of this abnormally high energy state, free screening charges collect to neutralize the surface. It is possible to eject a pulse of these charges and/or induce a field emission pulse by altering the material's internal polarization. The popular view of the process is that ferroelectric emission results from the expulsion of the free screening charge from the material's surface upon a rapidly induced change of the internal polarization. Another possibility is that ferroelectric emission is actually a field emission process wherein an extremely large electric field, generated by the spontaneous bound charge, is caused to exist across a nonferroelectric layer on the surface.

One advantage of a ferroelectric emission display, in particular, is that it can be fabricated in "plane-to-plane" geometry, which is not possible for field emission displays. Significant uses would include flat panel television screens and computer display devices.

Ferroelectric electron emission used in luminescent flat panel displays is known in the art. See, in particular, U.S. Pat. No. 5,453,661, issued Sep. 26, 1995 and U.S. Pat. No. 5,508,590, issued Apr. 16, 1996, which are hereby incorporated by reference as if fully contained herein. These disclose ferroelectric- emission FPDs. Both of these patents teach using lead zirconium titanate (PZT) and lead zirconium lanthanum titanate (PZLT) as ferroelectric electron emitters.

A second broad category of flat panel display system is the liquid crystal display (LCD). A liquid crystal layer in a flat panel display is arranged so that the molecules follow a specific alignment. This alignment can be changed with an external electric field, resulting in a corresponding change in the transmissivity of the liquid crystal material to light passing through it. Since the liquid crystal molecules respond to an external applied voltage, liquid crystals can be used as an optical switch, or light valve. In a typical configuration, the liquid crystal display comprises a front glass plate and a back glass plate. The space between the plates is filled with liquid crystal polymer. Various types of liquid crystal polymer are used. The principal classifications of liquid crystal material are twisted pneumatic, guest-host (or Heilmeier), phase change guest-host and double layer guest host. The type of liquid crystal employed determines the type of optical modulation that is effected by the light valve. For example, twisted pneumatic material reorients the polarization of the light (usually by ninety degrees). Guest-host materials, so-called by the presence of a dye that aligns itself with the liquid crystal molecules, modulate light as a consequence of the property of the dye to absorb or transmit light in response to the orientation of the liquid crystal molecules. In phase-change guest-host, the molecules of the liquid crystal material are arranged into a spiral form that blocks the majority of the light in the OFF state. The application of a voltage aligns the molecules and permits the passage of light. A double-layer guest-host liquid crystal comprises two guest-host liquid crystals arranged back-to-back back with a ninety degree orientation between the molecular alignment of the two cells. Liquid crystal displays may be arranged to operate in a transmissive mode, requiring backlighting, or in a reflective mode for operation under high ambient light conditions, or in a combination of the two.

Liquid crystal displays are typically used such that pixels of liquid crystal material are arranged in a matrix form. The matrix displays are classified into passive and active types in terms of the driving method. In a typical passive display, transparent electrodes are patterned on both facing glass plates in perpendicular arrays. The repeating distance of the electrodes corresponds to the pixel dimension. In a typical active matrix, an active driving or switching device is provided for each pixel on a rear panel of the display. The driver is connected electrically to the edge of the display, and is switched with an external electrical signal. The conducting electrode is patterned to follow the pixel shape on the rear glass panel, but is a continuous film on the front plate.

Passive displays are easier to fabricate, but in practice are more difficult to operate. There are conducting lines on both sides of the display, and the drive circuits are more complicated. Passive displays use the multiplexing of signals on the opposing glass plates, which means that voltage pulses are repetitively intermixed and transmitted along row and column electrodes, combining at a cross point, that is, at the pixel being addressed. A pixel is turned ON when a voltage is present at both sides of the liquid crystal. One problem of a passive matrix is that a transparent conductor for both opposing plates must be patterned, and thousands of connections are required. Also, the response time of the more demanding liquid crystal material used in passive displays limits performance.

The limitations of a multiplexing scheme inherent in a passive display can be overcome by placing an active driving device behind each pixel. In an active display, the switch at each pixel simplifies the electronics of the display. The front panel is not patterned and simply acts as a ground electrode. Problems due to voltage nonuniformity are reduced or eliminated. Twisted pneumatic crystal material can be used instead of the more demanding supertwisted variety. The typical active matrix type liquid crystal display has a configuration in which memory elements each consisting of a capacitor and a nonlinear resistor element such as a diode or a transistor are connected to respective pixels. The capacitors are stored with charge while the nonlinear resistor elements are caused to operate in accordance with an input signal. The display continues to operate by virtue of the charge stored in the capacitors even after the input signal disappears, thus maintaining contrast in approximately the same level as that obtained by static driving (i.e., a static, constant signal).

The thin-film transistor is most commonly used as the active driving device, although the diode and MIM (metal-insulator-metal) element are also used.

In an active matrix using thin-film transistors, image information (an input signal) is applied to the source electrode and transmitted to the liquid crystal, via an electrical channel that is on-off controlled by a voltage applied to the gate electrode, and stored as a charge by a capacitance of the liquid crystal. However, the charge held by the liquid crystal decreases with time because of leakage in each liquid crystal itself, a leakage current in the thin-film transistor, and other factors. Therefore, the contrast of a displayed image likely lowers with time. The complex process of forming the thin-film transistors and the resulting low yield make this type of matrix expensive to manufacture.

To solve the above problem, it is known in the art to use ferroelectric matrix drivers as the active driving devices instead of thin-film transistors. See U.S. Pat. No. 5,635,949 and U.S. Pat. No. 4,021,798, which are hereby incorporated by reference as if fully contained herein. With a ferroelectric material, it is possible to produce high quality images with a relatively simple structure and a reduced number of production steps.

An active ferroelectric driving device of a liquid crystal display pixel utilizes the ferroelectric's remanent polarization, in which even after application of an electric field to the ferroelectric material has ceased, an electric field caused by remanent polarization remains in the material. The remanent polarization is decreased, eliminated or reversed by applying an electric field of opposite polarity. After a voltage has been applied to the ferroelectric material portion of an active switching element, an internal electric field remains in the ferroelectric material due to the remanent polarization. The internal electric field causes a remanent voltage to be applied to the liquid crystal portion of the display pixel. The driver can be designed so that the remanent voltage across the liquid crystal portion is large enough to selectively influence the transmittance of light through the liquid crystal portion. As a result it becomes possible to provide a liquid crystal display capable of producing clear, high-contrast images. However, the ferroelectric portion in such a display must possess high residual polarizability in order to maintain a large remanent electric field in the liquid crystal portion. Also, the ferroelectric material should possess very low leakage characteristics, so that the remanent electric field does not dissipate rapidly.

In both known applications of ferroelectric material in flat panel displays, that is, as an electron emitter and as an active-matrix driving element in a LCD, the ferroelectric properties are used to transfer energy from the ferroelectric portion to a nonferroelectric portion of the flat panel display. In both applications, the transfer of energy and the overall function of the ferroelectric portion depends ultimately on polarizability and polarization-switching in the ferroelectric portion. In addition, to operate a typical flat panel display, the driving system scans, each pixel 100–300 times per second. In the art, it has been suggested to use ceramic ferroelectric oxides, namely lead zirconium titanate (PZT) and lead lanthanum zirconium titanate (PLZT), as the ferroelectric element in both electron emitters and active matrix switching devices in LCDs. Both PZT and PLZT possess high polarizability relative to other ferroelectric materials. For example, when subjected to a saturating electric field, PZT capacitors with a thickness in excess of 3000 Å typically show remanent polarization values, 2Pr, of about 35 $\mu C/cm^2$ (e.g., see U.S. Pat. No. 5,519,234, FIG. 25). In the study reported by Auciello et al., Appl. Phys. Lett. 66 (17), 2183, the 2Pr-value of PZT-capacitors with a thickness of 8000 Å was measured to be 40–50 $\mu C/cm^2$. Also, both PZT and PLZT can be switched rapidly, on the order of tens of nanoseconds. On the other hand, the polarizability of PZT and PLZT drops precipitously as film thickness decreases below 3000 Å. Below 1000 Å, the 2Pr-value of PZT approaches zero. Also, PZT and PZLT show fatigue symptoms immediately upon being subjected to voltage switching tests. Fatigue means a deterioration of desired ferroelectric properties as a result of polarization switching. The 2Pr-value of PZT and PZLT can drop to one-half its initial value after about $10^6$ polarization switching cycles. PZT and PZLT thin films also typically show a high leakage current of about $10^6$ A/cm$^2$.

It is, therefore, desirable to find structures of flat panel displays and methods of fabricating and using such structures that improve those already known in the art. In particular, it desirable to find a material to use in that panel displays, either as an electron emitter or as part of the active driving element of a liquid crystal portion, that possesses manufacturing or operating characteristics that are superior to those of PZT, PZLT, and other ferroelectric compounds known in the art.

Solution to the Problem

It is an object of this invention to provide ferroelectric optical display systems, in particular flat panel display systems containing a ferroelectric layered superlattice material.

A feature of the invention is the use of ferroelectric layered superlattice materials in an optical display device to selectively influence the operation of an optical element of the device. The invention relates particularly to flat panel displays useful as viewing screens in devices such as computers and televisions.

Another feature of the invention is that the layered superlattice material can be deposited as a thin film with a thickness in the range 50–4000 Å, preferably in the range 500–1400Å, and most preferably with a thickness of about 1000 Å.

In one embodiment of the invention, the optical display contains luminescent material, and the layered superlattice material is caused to emit electrons that impinge the luminescent material to cause it to emit light.

In another embodiment of the invention, the optical display contains liquid crystal material, and the ferroelectric layered superlattice material is polarized to exert an electric field in the liquid crystal material, thereby selectively influencing the transmissivity of light through the liquid crystal material.

One aspect of the invention is the use of precursors that contain metal moieties in effective amounts for spontaneously forming in optical displays a ferroelectric layered superlattice material upon drying and heating of the precursor. The precursors preferably contain a polyoxyalkylated metal portion having a molecular structure including a metal-oxygen-metal bond.

Another feature of the invention is that the layered superlattice material can contain amounts of the so-called superlattice generator elements and B-site elements in excess of the stoichiometrically balanced amounts. Excess amounts of such elements enhance certain desired properties of the layered superlattice materials, such as low imprint and low fatigue.

In preferred embodiments of the invention, the layered superlattice material comprises strontium bismuth tantalate, and at least one the metals bismuth and tantalum is present in an excess amount.

In other preferred embodiments of the invention, the layered superlattice material comprises strontium bismuth tantalum niobate, and at least one of the metals bismuth, tantalum and niobium is present in an excess amount.

Another aspect of the invention is a method for fabricating a ferroelectric device in an optical display. The method generally includes providing a substrate; providing a precursor containing metal moieties for spontaneously forming a ferroelectric layered superlattice material upon drying and heating the precursor; applying the precursor to the substrate; drying the precursor to form a dried material on said substrate; and heating the dried material at a temperature of between 500° C. and 1000° C. to yield a layered superlattice material containing the metals. Preferred embodiments of the precursor contain an excess amount of at least one of the superlattice generator and B-site elements. Other preferred embodiments of the precursor contain metal moieties in effective amounts for forming strontium bismuth tantalate or strontium bismuth tantalum niobate. Preferred embodiments of such precursors also contain excess amounts of at least one of bismuth, tantalum and niobium.

BRIEF DESCRIPTION OF THE DRAWINGS

FIG. 2 is a cross-sectional illustration of a pixel portion of an optical display containing a luminescent layer and a ferroelectric electron emitter element comprising layered superlattice material according to the invention;

FIG. 3 is a top view of a ring-patterned electrode located on the ferroelectric electron emitter of FIG. 2.

FIG. 4 is a top view of a fork-patterned electrode located on the ferroelectric electron emitter of FIG. 3.

DETAILED DESCRIPTION OF THE PREFERRED EMBODIMENT

1. Overview

Figure 1:
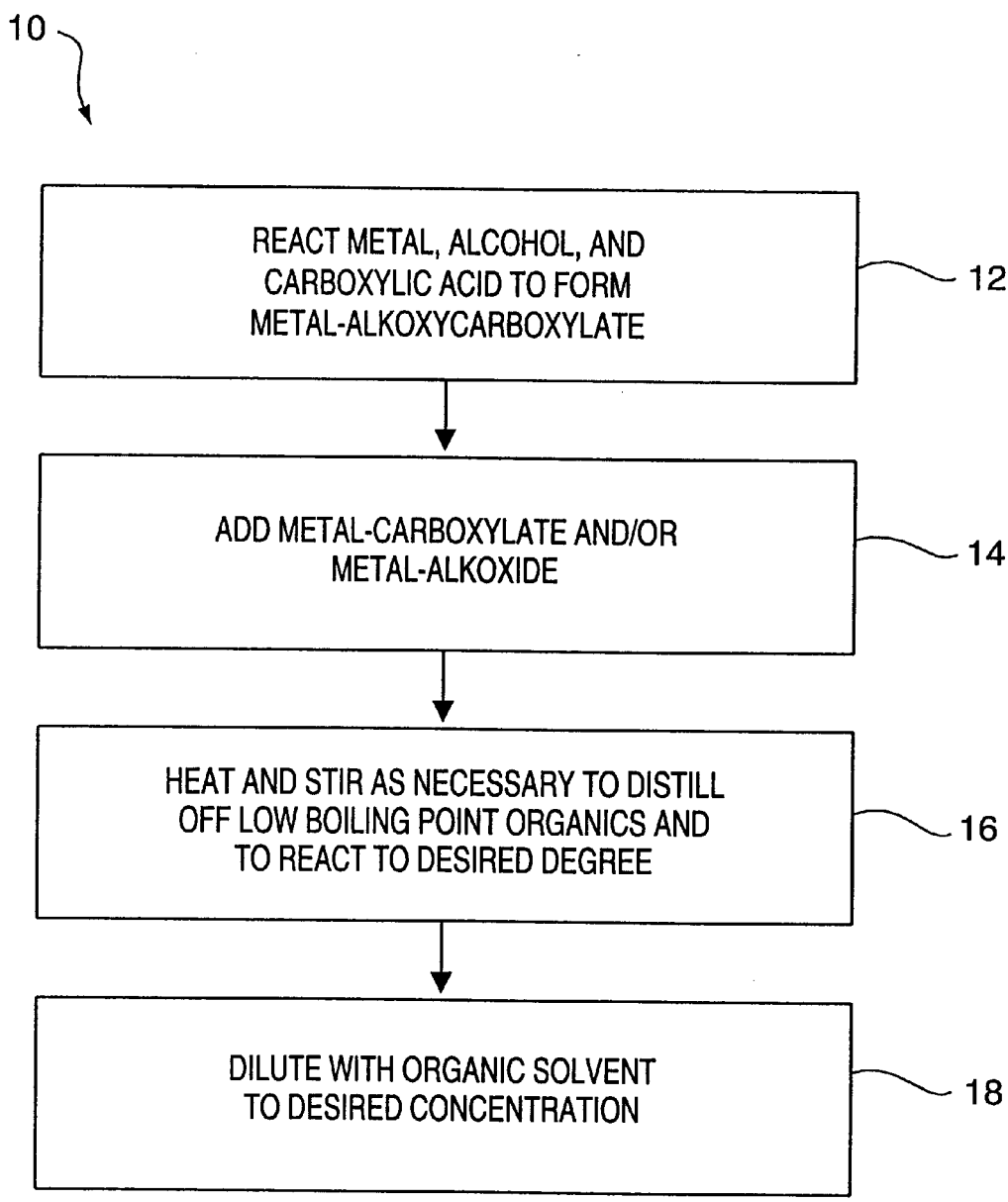
FIG. 1 depicts a flow chart of a generalized process according to the invention for preparing a liquid precursor of a layered superlattice material according to the invention.

The present invention pertains to the field of optical displays and, more particularly, to high performance thin-film layered superlattice materials for use in ferroelectric flat panel displays. Still more specifically, a single liquid precursor solution preferably is used to manufacture a thin-film ferroelectric crystalline material having multiple layers that present an oxygen octahedral lattice.

Ferroelectric layered perovskite-like materials are known, and have been reported as phenomenological curiosities. The term "perovsklite-like" usually refers to a number of interconnected oxygen octahedral. A primary cell is often formed of an oxygen octahedral positioned within a cube that is defined by large A-site metals where the oxygen atoms occupy the planar face centers of the cube and a small B-site element occupies the center of the cube. In some instances, the oxygen octahedral may be preserved in the absence of A-site elements. The terms "layered superlattice materials" or "layered superlattice compounds" are used to indicate the unique structural nature of these chemical compounds. Although other layered crystalline materials exist and are known, the layered superlattice compounds are distinct in that the layers, or lattices, are not identical repetitions of the same structure and composition. Rather, the layered superlattice materials comprise alternating perovskite-like ferroelectric layers and simpler non-ferroelectric layers combined in a single, crystalline structure. Also, the layered superlattice materials do not typically form as a single crystal; rather, the material is polycrystalline. In the polycrystalline state, the structure of the materials includes grain boundaries, point defects, dislocation loops and other microstructure defects. Yet, within each grain, the structure is predominantly repeatable units containing one or more ferroelectric layers and one or more intermediate non-ferroelectric layers spontaneously linked in an interdependent manner. It should, therefore, be emphasized that the layered superlattice materials are not heterostructures; that is, they are not agglomerations of essentially separate, but spatially contiguous layers or lattices; nor are they structures in which essentially a single type of crystal layer is repeated, but with different chemical elements occupying various sites. Rather, the layered superlattice materials are materials in which different types of layers are integrally connected to form a single crystalline structure. It must also be emphasized for clarity that the perovskite-like layers are not actually perovskites. The term "perovskite-like" has been used in the literature to describe approximately the structure of the ferroelectric layer using a term that is already familiar to those skilled in the art.

The layered superlattice materials of this invention were discovered by G. A. Smolenskii, V. A. Isupov, and A. I. Agranovskaya (See Chapter 15 of the book, *Ferroelectrics and Related Materials*, ISSN 0275–9608, [V.3 of the series Ferroelectrics and Related Phenomena, 1984] edited by G. A. Smolenskii, especially sections 15.3–15). They are far better suited for ferroelectric optical display applications than any prior materials used for these applications. These layered superlattice materials comprise complex oxides of metals, such as strontium, calcium, barium, bismuth, cadmium, lead, titanium, tantalum, hafnium, tungsten, niobium zirconium, bismuth, scandium, yttrium, lanthanum, antimony, chromium, and thallium that spontaneously form layered superlattices, i.e. crystalline lattices that include alternating layers of distinctly different sublattices, such as ferroelectric perovskite-like and non-ferroelectric sublattices. Generally, each layered superlattice material will include two or more of the above metals; for example, strontium, bismuth and tantalum form the layered superlattice material strontium bismuth tantalate, $SrBi_2Ta_2O_9$.

The use in integrated circuits of ferroelectric capacitors comprising PZT, PZLT, and other related compounds, on the one hand, and ferroelectric capacitors comprising layered superlattice compounds, on the other hand, is known in the art. See, forexample, U.S. Pat. No. 5,338,951 and U.S. Pat. No. 5,439,845. It is known in the art that the polarizability and the residual polarization in thin-film capacitors made with PZT is higher than in capacitors using other known compounds. For example, the remanent polarization value, 2Pr, in PZT capacitors is typically as high as 50–60 $\mu C/cm^2$. Also, U.S. Pat. No. 5,453,661 teaches that the PZT or other ferroelectric thin film used as an electron emitter preferably possesses a highly oriented polycrystalline structure, most preferably with a (001), or C-axis, crystal orientation.

In contrast, the remanent polarization value in capacitors made with a layered superlattice compound such as strontium bismuth tantalum niobate is typically only in the range 10–30 $\mu C/cm^2$. The operational functionality of ferroelectric material in flat panel displays is heavily dependent on the polarizability of the ferroelectric material. Therefore, it could be initially expected that the utility of layered superlattice compounds in flat panel displays would be significantly inferior to the utility of PZT, PLZT, and other similar compounds.

Nevertheless, the unique structure of the layered superlattice materials and their formation from liquid precursor solutions using low-temperature heating make it possible to fabricate ferroelectric thin-films with enhanced utility for flat panel displays.

Using preferred methods, thin films of layered superlattice compounds can be economically and reliably fabricated on a commercial scale with uniform film thicknesses in the range 500–1400 Å. This is advantageous because the prior art teaches that the threshold excitation voltage for electron emission decreases as film thickness decreases. Thin films of PZT cannot practically be made thinner than about 1700 Å. Thus, the thin films of layered superlattice material enhance the emission of high-intensity electron beams at high kinetic energy at low voltage. It is thereby possible to cause electron emission from thin films of layered superlattice materials of sufficient beam intensity and kinetic energy to cause luminescence in conventional phosphors by applying electrical potentials across the thin film in a range as low as 1–10 V, that is, within the operating voltage range of complementary metal-oxide semiconductor (CMOS) devices.

The special liquid precursors also allow the fabrication of very thin films of ferroelectric material possessing uniform chemical composition and uniform thickness and much less cracking and other flaws than in conventionally produced ferroelectric thin films. Controlled, uniform thickness is important in flat panel displays because these displays require flat layers and uniform distance between certain layers within very precise tolerances.

Thin films of layered superlattice materials are able to sustain prolonged polarization switching under AC or DC voltage excitation. They will exhibit stable emission characteristics and high residual polarization after more than $10^{12}$ voltage switching cycles at 10 V. Thus, flat panel display devices incorporating thin films of layered superlattice materials have virtually infinite operating lifetimes.

Thin films layered superlattice materials, which possess high residual polarization and low charge leakage over their virtually infinite operating lifetime, exert high remanent electric fields in liquid crystal display material.

The capability to make very thin films of layered superlattice material in an optical display is also advantageous because the very thin film is virtually transparent. Transparent layers are important because they do not interfere with the display screen image when viewed from the front, or with the passage of backlighting from the back.

Furthermore, unlike the highly oriented polycrystalline structures taught by the prior art, the layered superlattice mapolycrystalline invention preferably have a polycrystalline structure with mixed orientation. "Mixed orientation" of the layered superlattice crystals means that at least two different crystal orientations are present to a significant degree in the material. For example, layered superlattice materials with mixed A-axis and C-axis crystal orientation possess some better ferroelectric properties (e.g., lower imprint values and less fatigue) than material with predominantly C-axis, or (001), orientation only.

The present invention provides special liquid precursor solutions and methods of using these precursor solutions to make fatigue-resistant ferroelectric flat panel display devices. The special liquid precursor solutions permit the formation of corresponding ferroelectric materials through a low-temperature anneal process. The low-temperature anneal enables the widespread use of these materials in flat panel displays in which the other materials and the electronics of the display preclude high-temperature fabrication steps.

The special liquid precursors are prepared to be stable so that they have a relatively long shelf-life, at least between two and six months duration. In contrast, the solutions used in the sol-gel methods disclosed in the prior art are chemically unstable and have virtually no shelf-life. The stability of the precursors contributes to cost-efficiency and uniformity among production runs.

2. Detailed Description

The present invention now will be described more fully with reference to drawings in which preferred embodiments of the invention are shown. This invention may, however, be embodied in many different forms and should not be construed as limited to the embodiments set forth herein; rather, these embodiments are prided so that this disclosure will be thorough and complete, and will fully convey the scope of the invention to those skilled in the art. In the drawings, the thickness of layers and regions are exaggerated for clarity. Like numbers refer to like elements throughout.

All types of layered superlattice materials may be generally summarized under the average empirical formula:

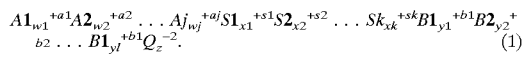

Note that Formula (1) refers to a stoichiometrically balanced list of superlattice-forming moieties. Formula (1) does not represent a unit cell construction, nor does it attempt to allocate ingredients to the respective layers. In Formula (1), A1, A2 . . . Aj represent A-site elements in a perovskite-like octahedral structure, which includes elements such as strontium, calcium, barium, bismuth, lead, and mixtures thereof, as well as other metals of similar ionic radius. S1, S2 . . . Sk represent superlattice generator elements, which preferably include only bismuth, but can also include trivalent materials such as yttrium, scandium, lanthanum, antimony, chromium, and thallium. B1, B2 . . . Bl represent B-site elements in the perovskite-like structure, which may be elements such as titanium, tantalum, hafnium, tungsten, niobium, zirconium, and other elements, and Q represents an anion, which preferably is oxygen but may also be other elements, such as fluorine, chlorine and hybrids of these elements, such as the oxyfluorides, the oxychlorides, etc. The superscripts in Formula (1) indicate the valences of the respective elements. The subscripts indicate the number of atoms of a particular element in the empirical formula compound. In terms of the unit cell, the subscripts indicate a number of atoms of the element, on the average, in the unit cell. The subscripts can be integer or fractional. That is, formula (1) includes the cases where the unit cell may vary throughout the material, e.g. in $Sr_{0.75}Ba_{0.25}Bi_2Ta_2O_9$, on the average, 75% of the A-sites are occupied by a strontium atom and 25% of the A-sites are occupied by a barium atom. If there is only one A-site element in the compound then it is represented by the "A1" element and w2...wj all equal zero. If there is only one B-site element in the compound, then it is represented by the "B1" element, and y2...yl all equal zero, and similarly for the superlattice generator elements. The usual case is that there is one A-site element, one superlattice generator element, and one or two B-site elements, although Formula (1) is written in the more general form because the invention intended to include the cases where either of the A and B sites and the superlattice generator can have multiple elements. The value of z is found from the equation:

$$2z=(a1w1+a2W2 \ldots +ajwj)+(s1x1+s2x2 \ldots +skxk)+(b1y1+b2y2 \ldots +blyl). \quad (2)$$

The layered superlattice materials do not include every material that can be fit into Formula (1), but only those ingredients which spontaneously form themselves into a layer of distinct crystalline layers during crystallization. This spontaneous crystallization is typically assisted by thermally treating or annealing the mixture of ingredients. The enhanced temperature facilitates ordering of the superlattice-forming moieties into thermodynamically favored structures, such as perovskite-like octahedra. The term "superlattice generator elements" as applied to S1, S2...Sk, refers to the fact that these metals are particularly stable in the form of a concentrated metal oxide layer interposed between two perovskite-like layers, as opposed to a uniform random distribution of superlattice generator metals throughout the layered superlattice material. In particular, bismuth has an ionic radius that permits it to function as either an A-site material or a superlattice generator, but bismuth, if present in amounts less than a threshold stoichiometric proportion, will spontaneously concentrate as a non-perovskite-like bismuth oxide layer.

Formula (1) at least includes all three of the Smolenskii-type ferroelectric layered superlattice materials, namely, those having the respective formulae:

and

wherein A is an A-site metal in the perovskite-like superlattice, B is a B-site metal in the perovskite-like superlattice, S is a trivalent superlattice-generator metal such as bismuth or thallium, and m is a number sufficient to balance the overall formula charge. Where m is a fractional number, the overall average empirical formula provides for a plurality of different or mixed perovskite-like layers.

The term 'layered superlattice materials' includes both layered superlattice materials that are formed of repeating identical perovskite-like oxygen octahedral layers and mixed layered superlattice materials. Mixed layered superlattice materials are hereby defined to include metal oxides having at least three interconnected layers that respectively have an ionic charge: (1) an A/B layer that contains an A-site metal, a B-site metal, or both A and B-sit,e metals, which A/B layer may or may not have a perovskite-like oxygen octahedral structure; (2) a superlattice-generating layer; and (3) an AB layer that contains both an A-site metal and a B-site metal, which AB layer has a perovskite-like oxygen octahedral structure and has a lattice that is different from the A/B layer. The mixed layered superlattice material has a plurality of collated layers in a sequence at least including an A/B layer having an A/B material ionic subunit cell, a superlattice-generator layer having a superlattice-generator ionic subunit cell, and a perovskite like AB layer having a perovskite-like octahedral ionic subunit cell. The A/B layer and the perovskite-like AB layer have different crystal structures with respect to one another, despite the fact that they both include metals which are suitable for use as A-site and/or B-site metals. It should not be assumed that the A/B layer must contain both A-site metals and B-site metals; it may contain only A-site metals or only B-site metals, and does not necessarily have a perovskite-like lattice. A useful feature of these materials is the fact that an amorphous or non-ordered single mixture of superlattice-forming metals, when heated in the presence of oxygen, will spontaneously generate a thermodynamically-favored layered superlattice.

It should also be understood that the term layered superlattice material herein also includes doped layered superlattice materials. That is, any of the material included in formula (1) may be doped with a variety of materials, such as silicon, germanium, uranium, zirconium, tin or hafnium. For example, strontium bismuth tantalate may be doped with a variety of elements as given by the formula:

$$(Sr_{1-x}M1_x)Bi_2(Ta_{1-y}M2_y)O_9+\alpha M3 0, \quad (6)$$

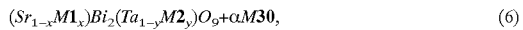

where M1 may be Ca, Ba, Mg, or Pb, M2 may be Nb, Bi, or Sb, with x and y being a number between 0 and 1 and preferably $0 \leq x \leq 0.2$, $0 \leq y \leq 0.2$, M3 may be Si, Ge, U, Zr, Sn, or Hf, and preferably $0 \leq \alpha \leq 0.05$. Materials included in this formula are also included in the term layered superlattice materials used herein.

Similarly, a relatively minor second component may be added to a layered 30 superlattice material and the resulting material will still be within the invention. For example, a small amount of an oxygen octahedral material of the formula $ABO_3$ may be added to strontium bismuth tantalate as indicated by the formula:

$$(1-x)\ SrBi_2Ta_2O_9+xABO_3, \quad (6)$$

where A may be Bi, Sr, Ca, Mg, Pb, Y, Ba, Sn, and Ln; B may be Ti, Zr, Hf, Mn, Ni, Fe, and Co; and x is a number between 0 and 1, preferably, $0 \leq x \leq 0.2$.

Likewise the layered superlattice material may be modified by both a minor $ABO_3$ component and a dopant. For example, a material according to the formula:

$$(1-x)\ SrBi_2Ta_2O_9+xABO_3, +\alpha MeO \quad (8)$$

where A may be Bi, Sb, Y and Ln; B may be Nb, Ta, and Bi; Me may be Si, Ge, U, Ti, Sn, and Zr; and x is a number between 0 and 1, preferably, $0 \leq x \leq 0.2$, is contemplated by the invention.

The term "stoichiometric" herein, may be applied to both a solid film of a material, such as a layered superlattice material, or to the precursor for forming a material. When it is applied to a solid thin film, it refers to a formula which shows the actual relative amounts of each element in a final solid thin film. When applied to a precursor, it indicates the molar proportion of metals in the precursor. A "balanced" stoichiometric formula is one in which there is just enough of each element to form a complete crystal structure of the material with all sites of the crystal lattice occupied, though in actual practice there always will be some defects in the crystal at room temperature. For example, both $SrBi_2TaNbO_9$ and $SrBi_2Ta_{1.44}Nb_{0.56}O_9$ are balanced stoichiometric formulas. In contrast, a precursor for strontium bismuth tantalate in which the molar proportions of strontium, bismuth and tantalum are 1, 2.2 and 2.3, respectively, is represented herein by the unbalanced "stoichiometric" formula $SrBi_{2.2}Ta_{2.3}O_{10.5}$, since it contains excess bismuth and tantalum beyond what is needed to form a complete crystalline material. In this disclosure an "excess" amount of a metallic element means an amount greater than the stoichiometrically balanced amount required to bond with the other metals present to make the desired material, with all atomic sites occupied and no amount of any metal left over. It is believed that the presence of excess B-site element(s) and/or the presence of excess superlattice generator element(s) in the precursor enhances the ferroelectric properties of the resulting layered superlattice material. Up to 100 percent excess amounts of the lattice generator(s) or the B-site elements are believed to enhance the ferroelectric properties of layered superlattice materials, such as polarizability, coercive field, resistance to fatigue from polarity switching, leakage current. Typically, excess amounts of up to about twenty percent are included to enhance ferroelectric properties.

The layered superlattice material layer is preferably produced from a liquid precursor solution that includes a plurality of metal moieties in effective amounts for yielding the desired layered superlattice material. The solution is applied to a substrate in order to form a thin film. This film is subjected to a low-temperature anneal for purposes of generating the layered superlattice material from the film.

The word "precursor" is often used ambiguously in this art. It may mean a solution containing one metal that is to be mixed with other materials to form a final solution, or it may mean a solution containing several metals made-ready for application to a substrate. In this discussion we shall generally refer to the individual precursors in non-final form as "initial precursors" or "pre-precursors", and the precursor made-ready to apply as the "final precursor" or just "precursor," unless the meaning is clear from the context. In intermediate stages the solution may be referred to as the "intermediate precursor."

A single precursor solution preferably contains all of the metal moieties that are needed to form a layered superlattice material after accounting for volatilization of metal moieties during the crystallization process.

It is preferred to use a metal alkoxycarboxylate precursor that is prepared according to the reactions:

$$alkoxide—M^{+n}+nR—OH \rightarrow M(—O—R)_n+n/2\ H_2; \quad (5)$$

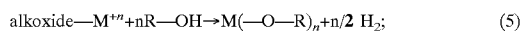

$$carboxylates—M^{+n}+n\ (R—COOH) \rightarrow M(—OOC—R)_n+n/2\ H_2; \quad (6)$$

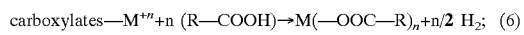

and $$alkoxycarboxylates—M(—O—R')_n+b\ R—COOH+heat \rightarrow$$
$$(R'—O—)_{n-b}M(—OOC—R)_b+b\ HOR; \quad (7)$$

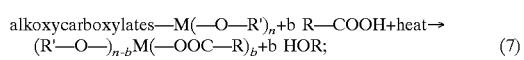

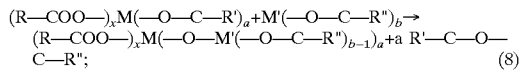

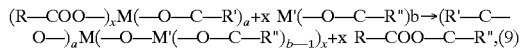

where M is a metal cation having a charge of n; b is a number of moles of carboxylic acid ranging from 0 to n; R' is preferably an alkyl group having from 4 to 15 carbon atoms; R is an alkyl group having from 3 to 9 carbon atoms; R" is an alkyl group preferably having from about zero to sixteen carbons; and a, b, and x are integers denoting relative quantities of corresponding substituents that satisfy the respective valence states of M and M'. M and M' are preferably selected from the group consisting of strontium, bismuth, niobium and tantalum. The exemplary discussion of the reaction process given above is generalized and, therefore, non-limiting. The specific reactions that occur depend on the metals, alcohols, and carboxylic acids used, as well as the amount of heat that is applied.

The process of making the precursor solutions includes several different steps. The first step includes providing a plurality of polyoxyalkylated metals moieties including an A-site metal moiety, a B-site metal moiety, and a superlattice-generator metal moiety. It is to be understood that the terms "A-site metal" and "B-site metal" refer to metals that are suitable for use in a perovskite-like lattice, but do not actually occupy A-site and B-site positions in solution. The respective metal moieties are combined in effective amounts for yielding, upon crystallization of the precursor solution, a layered superlattice material. The combining step preferably includes mixing the respective metal moieties to substantial homogeneity in a solvent, preferably with the addition of an excess amount of at least the superlattice generator element, which is usually bismuth. It is believed that bismuth moieties and similar metal moieties are prone to volatilization losses through sublimation. Alternatively, it is believed that excess bismuth oxides in the layered superlattice materials enhance desired ferroelectric properties. A preferred precursor design includes up to about fifteen percent more bismuth in the precursor than is desired from a stoichiometric standpoint in the final mixed layered superlattice material. The most preferred range of bismuth excess is from about five to ten percent.

FIG. 1 depicts a flow chart of a generalized process 10 according to the invention for forming a liquid precursor solution for fabricating thin films of layered superlattice material in flat panel display devices. In step 12 a first metal is reacted with an alcohol and a carboxylic acid to form a metal alkoxycarboxylate initial precursor. In a typical second step 14, at least one of a metal carboxylate, a metal alkoxide and a metal alkoxycarboxylate may be added to the metal alkoxycarboxylate. In step 16 the mixture of metal alkoxycarboxylate, metal carboxylate and/or metal alkoxide is heated and stirred as necessary to form metaloxygen-metal bonds and boil off any low-boiling organics that are produced by the reaction. Preferably, at least 50% of the metal-to-oxygen bonds of the final desired metal oxide are formed by the end of this step. In step 18, the solution is diluted with an organic solvent to produce a final precursor having the desired concentration. A solvent exchange step may take place simultaneously or subsequently for purposes of changing the solvent portion the precursor mixture.

For example, a reaction mixture including an alcohol, a carboxylic acid, and the metals, is refluxed at a temperature ranging from about 70° C. to 200° C. for one to two days, in order to facilitate the reactions. The reaction mixture is then distilled at a temperature above 100° C. to eliminate water and short chain esters from solution. The alcohol is preferably 2-methoxyethanol or 2-methoxypropanol. The carboxylic acid is preferably 2-ethylhexanoic acid. The reaction is preferably conducted in a xylenes or n-octane solvent. The reaction products are diluted to a molarity that will yield from 0.01 to 0.5 moles of the desired layered superlattice material compound per liter of solution.

The solution is mixed to substantial homogeneity, and is preferably stored under an inert atmosphere of desiccated nitrogen or argon if the final solution will not be consumed within several days or weeks. This precaution in storage serves to assure that the solutions are kept essentially water-Free and avoids the deleterious effects of water-induced polymerization, viscous gelling, and precipitation of metallic moieties that water can induce in alkoxide ligands. Even so, the desiccated inert storage precaution is not strictly necessary when the precursor, as is preferred, primarily consists of metals bonded to carboxylate ligands and alkoxycarboxylates.

The precursor mixing, distillation, solvent control, and concentration control steps have been discussed separately and linearly for clarity. However, these steps can be combined and/or ordered differently depending on the particular liquids used, whether one intends to store the precursor or use it immediately, etc. For example, distillation is usually part of solvent concentration control, as well as being useful for removing unwanted by-products, and thus both functions are often done together. As another example, mixing and solvent control often share the same physical operation, such as adding particular reactants and solvents to the precursor solution in a predetermined order. As a third example, any of these steps of mixing, distilling, and solvent and concentration control may be repeated several times during the total process of preparing a precursor.

A process of making electron emission flat panel displays according to the invention includes the manufacture of a precursor solution as described above, applying the precursor solution to a substrate, and treating the precursor solution on the substrate to form a layered superlattice material. The treating step preferably includes heating the applied precursor solution in an oxygen atmosphere to a sufficient temperature for purposes of eliminating organic ligands from the solution and crystallizing residual metal moieties in a mixed layered superlattice structure. The use of a liquid precursor solution makes possible a low annealing temperature or temperature of crystallization that is useful in forming solid metal oxide thin-films of the desired layered superlattice materials for use in flat panel displays.

According to the present understanding of the phenomenon of electron emission from ferroelectric bulk materials, in a steady state, the ferroelectric appears neutral to its surrounding environment because any remanent polarization is immediately compensated by free charge carriers. Thus, surface charge densities of about 30 $\mu C/cm^2$ or higher can exist at equilibrium state without affecting the surrounding environment. However, this charge equilibrium may be disturbed for short transient time, generating a surplus of charges at opposite faces of the affected volume. A mechanism that can change the polarization inside the material, and which is faster than the corresponding movement of electrons in response to the change, results in a high potential at the surface. Under certain conditions, charged particles can be liberated and accelerated thereby. Preferably, conditions are chosen to achieve a surplus of negative charges at the emitting surface, resulting in electron emission. The electrons are drawn from energetically favorable levels in the material. These levels may be screening charges of electrons trapped by defects, or others.

A fast change of the spontaneous polarization due to a phase shift, and/or partial reversal of the spontaneous polarization induced by the application of high electric field pulses to a ferroelectric thin film is preferably used. A phase shift offers the advantage that after emission the ferroelectric material relaxes back to its initial state prior to the voltage pulse. Thus, no resetting is necessary. Reversal inside the ferroelectric phase may require active resetting, either by applying pulses with alternating polarity, or by pulsing from a low continuous potential level to the opposite polarity. The emission dynamics are strongly dependent on the material composition, taking into account the kind of phase transition (first and second order), nucleation and domain wall motion, grain properties, defect concentration, and other known factors.

A ferroelectric electron-emission flat panel display typically includes first and second electrode arrays, which are spaced apart from one another to define an array of electrode pairs such that the electrode pairs produce an electric field upon application of a predetermined voltage across a given pair. The flat panel display also includes a ferroelectric thin film between the electrodes of each electrode pair, such that the ferroelectric thin film emits electrons therefrom in an electron emission path for each electrode pair, upon application of the predetermined voltage across the electrode pair. A luminescent, or phosphor, layer is present in the electron emission path of each electrode pair. The electrodes in the first and second arrays may extend in a direction along the respective first and second arrays to form top and bottom electrode pairs. The electrodes in the second electrode array may be patterned electrodes so that the electron emission path from each electrode pair passes through the corresponding patterned second electrode. Alternatively, each of the electrodes in the first and second arrays may extend in a direction transverse to the respective first and second arrays, to form side electrode pairs. In this case, the electron emission path from each electrode pair is transverse to the first and second electrodes of the corresponding electrode pair.

In FIG. 2, a cross-sectional view of a flat panel display according to a first preferred embodiment of the invention is illustrated. Display 20 may be thought of as a single display element (pixel) of a flat panel display that includes an array of display elements.

As shown in FIG. 2, flat panel display 20 includes first and second spaced apart electrodes 22 and 24, respectively, and ferroelectric thin film 26 between first and second spaced apart electrodes 22, 24. First electrode 22 is preferably formed on substrate 28. Ferroelectric thin film 26 is a layered superlattice material. Thin film 26 preferably comprises strontium bismuth tantalate, $SrBi_2Ta_2O_9$, or strontium bismuth tantalum niobate, $SrBi_2Ta_{2-x}Nb_xO_9$. Preferred embodiments also include amounts of at least one of bismuth, tantalum and niobium in excess of balanced stoichiometric amounts. In contrast to the teachings of the prior art, the layered superlattice material preferably has a crystalline structure of mixed orientation. Preferably the ferroelectric layer is etched between adjacent electrode pairs to produce a discreet ferroelectric region for each display element. Ferroelectric thin film 26 preferably has a thickness not greater than 4000 Å, more preferably between 500 Å and 1400 Å. Electrons may be emitted from ferroelectric thin film 26 in an electron emission path 27 upon application of polarization switching voltages of about 10 volts or less between electrodes 22 and 24. A luminescent layer 32 such as a phosphor is placed in the electron emission path 27 so that the emitted electrons impinge thereon and cause an optical effect, namely light emission by the luminescent layer 32.

As shown in FIG. 2, a third electrode 34 may also be present for accelerating the electrons which are emitted from ferroelectric thin film 26 into the luminescent layer 32. A support structure 36 maintains the luminescent layer 32 in spaced apart relation from ferroelectric layer 26, thereby creating a gap 38 there between. The gap is preferably maintained under vacuum conditions at a pressure of less than about $10^{-3}$ Torr. This contrasts with conventional FEDs, which require high minus vacuums on the order of $10^8$ to $10^{-9}$ Torr. In other embodiments described below, gap 38 is not present, and luminescent layer 32 is formed directly on ferroelectric thin film 26.

Substrate 28 can be any thin film or bulk material (such as MgO or $SrTiO_3$) or other material on which an appropriate template layer is deposited to yield suitable lattice matching and serve as a diffusion barrier to avoid possible destructive interactions between the substrate and the metal oxides in ferroelectric layered superlattice material thin film 26. Semiconductors (e.g., Si, GaAs) are possible substrate materials of the latter type. Prior to the deposition of the electrode layer 22 on the latter substrate materials, a diffusion barrier may be needed to avoid interdiffusion of the electrode layer 22 and the substrate 28 at the temperatures needed to precipitate an epitaxial electrode layer, which is useful to obtain optimized polarization hysteresis and reduced or negligible polarization fatigue. The electrode layers 22, 24 each may comprise a thin film of platinum (or other metal) or a multicomponent oxide material (YBaCuO, LaSrCoO, $RuO_2$, or other conducting oxide) with a structure similar to that of the layered superlattice material. Accelerator electrode layer 34 comprises a transparent conductive material, such as indium tin oxide (ITO) or antimony tin oxide. Located at the front, viewing surface of the flat panel display, accelerator electrode 34 is generally maintained at a reference potential with respect to (address and data) voltages applied to the active matrix.

As shown in FIG. 2, the first single pixel electrode 22 is preferably a solid electrode. The second single pixel electrode 24 is preferably a patterned electrode as shown in FIGS. 3 and 4. FIGS. 3 and 4 illustrate top views of alternative embodiments of second electrode 24. FIG. 3 illustrates a ring electrode 24a. FIG. 4 illustrates a fork electrode 24b. In all cases, the patterned second electrode 22 is used to support a voltage across the ferroelectric layered superlattice material while allowing electron emission from those areas which are not covered by the electrode material. Since the emission area is increased by the patterning, more electrons are emitted, thereby producing a brighter display.

Figure 5:
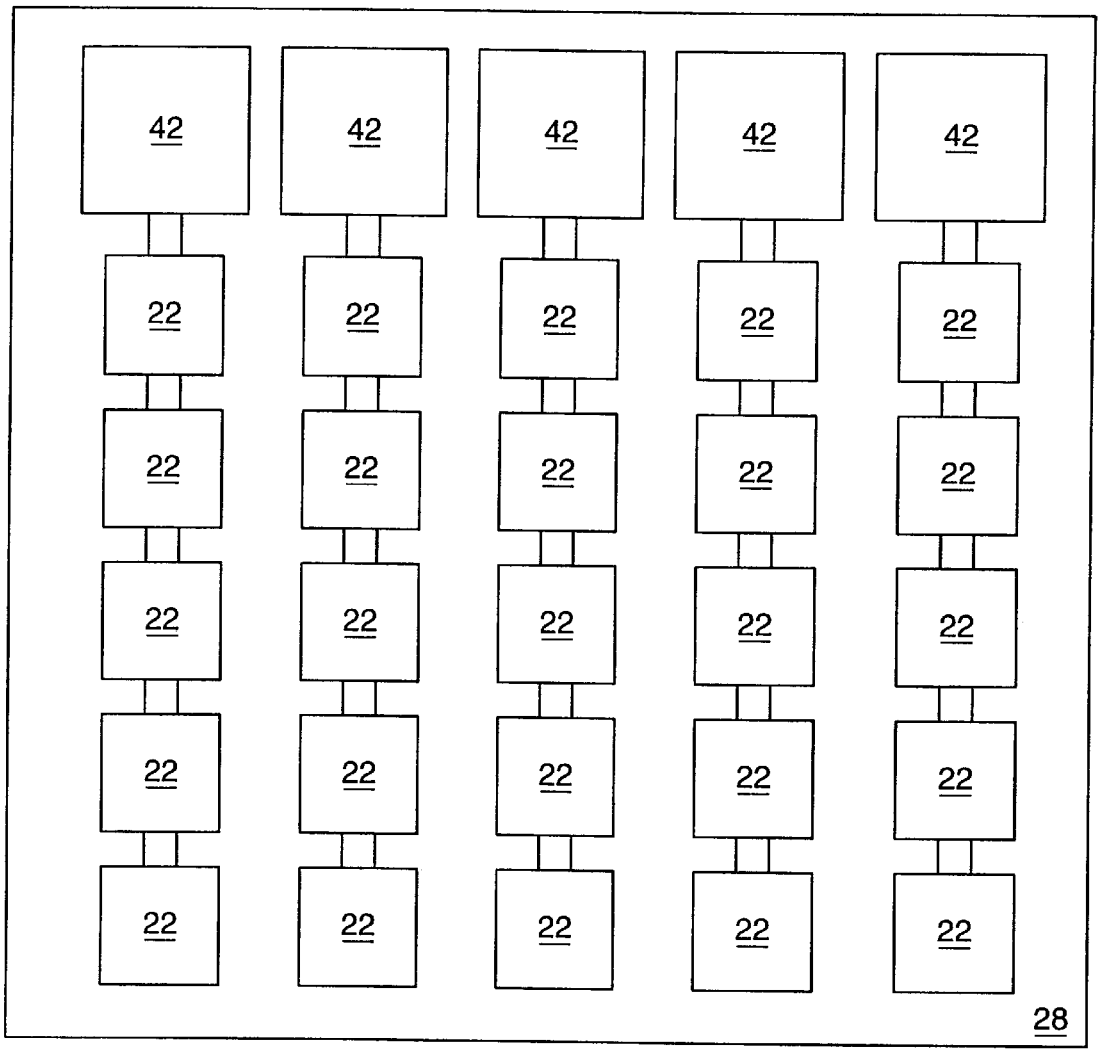
FIG. 5 is a schematic diagram of the top view of an electrode matrix in a flat panel display showing bottom electrodes arranged in columns, with each column electrically connected to a contact pad.

Matrix addressing systems in flat panel displays are typically arranged such that bottom electrodes are connected in columns and top electrodes are connected in rows, or vice versa. Each row and column is activated by a contact pad. FIG. 5 is a diagram of a top view of a ferroelectric FPD showing bottom electrodes 22 arranged in columns, with each column electrically connected to a contact pad 42.

Figure 6:
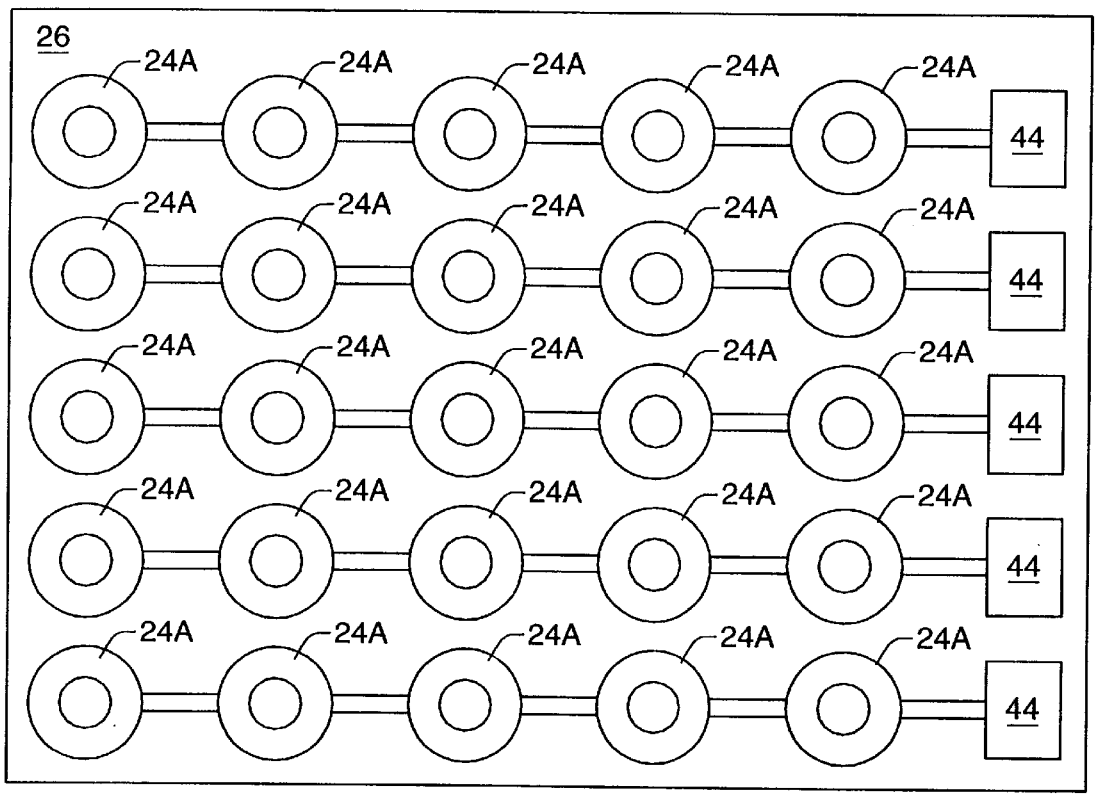
FIG. 6 is a schematic diagram of the top view of an electrode matrix in a flat panel display showing top ring electrodes arranged in rows, with each row electrically connected to a contact pad.

FIG. 6 is a diagram of a top view of a ferroelectric FPD showing top ring electrodes 24a arranged in rows, with each row electrically connected to a contact pad 44.

Figure 7:
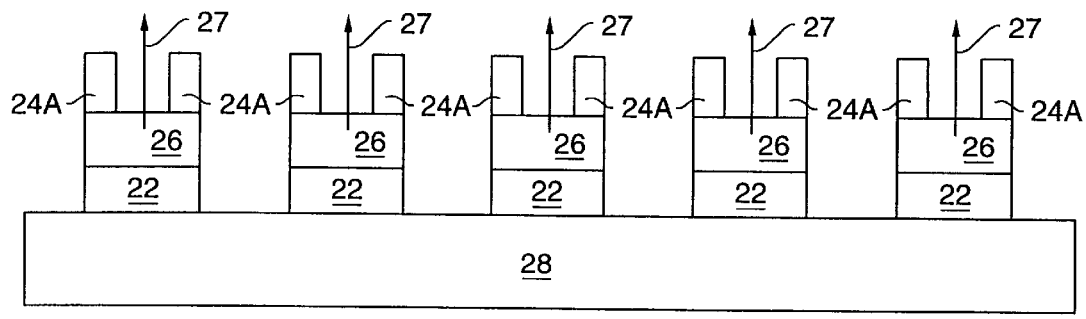
FIG. 7 is a section-view of an intermediate stage in the fabrication of an active matrix in which bottom electrodes are located on a substrate, patterned ferroelectric layered superlattice material thin films are located on the bottom electrodes, and patterned top electrodes are located on corresponding ferroelectric thin films.

FIG. 7 is a section-view of an intermediate stage in the fabrication of active matrix 50 in which bottom electrodes 22 are located on substrate 28, patterned ferroelectric layered superlattice material thin films 26 are located on bottom electrode 22, patterned electrodes 24a are located on corresponding thin films 26.

Figure 8:
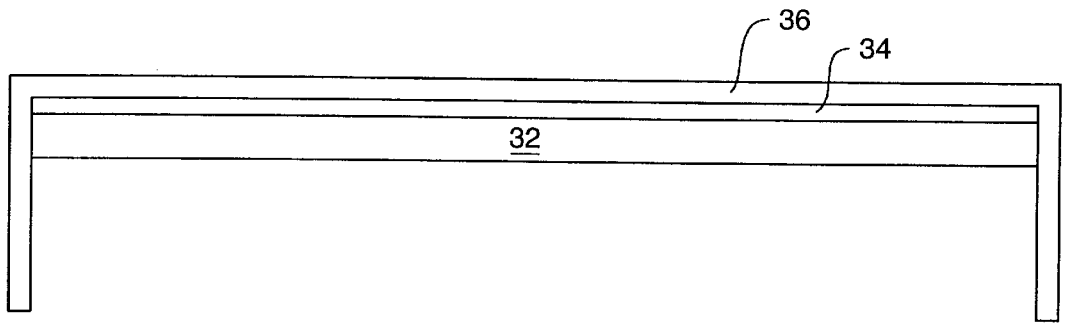
FIG. 8 is a section view of another intermediate stage in the fabrication of active- matrix luminescent display device in which a third accelerator electrode layer has been deposited on a second substrate, followed by formation of a luminescent layer on the third electrode.
Figure 9:
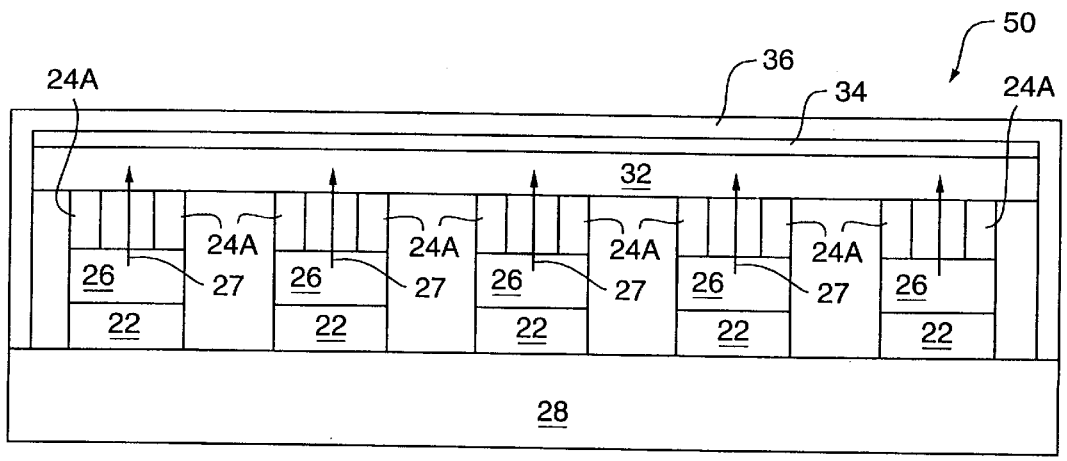
FIG. 9 shows the resultant luminescent flat panel display when the two substrates of FIGS. 7 and 8 are joined.

FIG. 8 is a section view of another intermediate stage in the fabrication of active matrix 50. FIG. 8 shows second substrate 36 on which third accelerator electrode layer 34 has been deposited, followed by formation of luminescent layer 32 on electrode 34. The matrix may contain a single type (i.e., wavelength emission spectrum) of phosphor or a plurality of phosphor types for providing a multicolor display. As shown in FIG. 9, substrate 36 is joined to substrate 28 using well known techniques in completing the display. They are preferably joined under a vacuum of at least $10^{-3}$ Torr, although atmospheric pressure or other gas environments may be used. Accordingly, the resultant flat panel display 50 of FIG. 9 includes a plurality of display elements each of which includes a ferroelectric thin film 26 comprising layered superlattice material which emits electrons onto luminescent layer 32 along an electron emission path 27 upon energization of appropriate row and column contacts 42 and 44.

Figure 10:
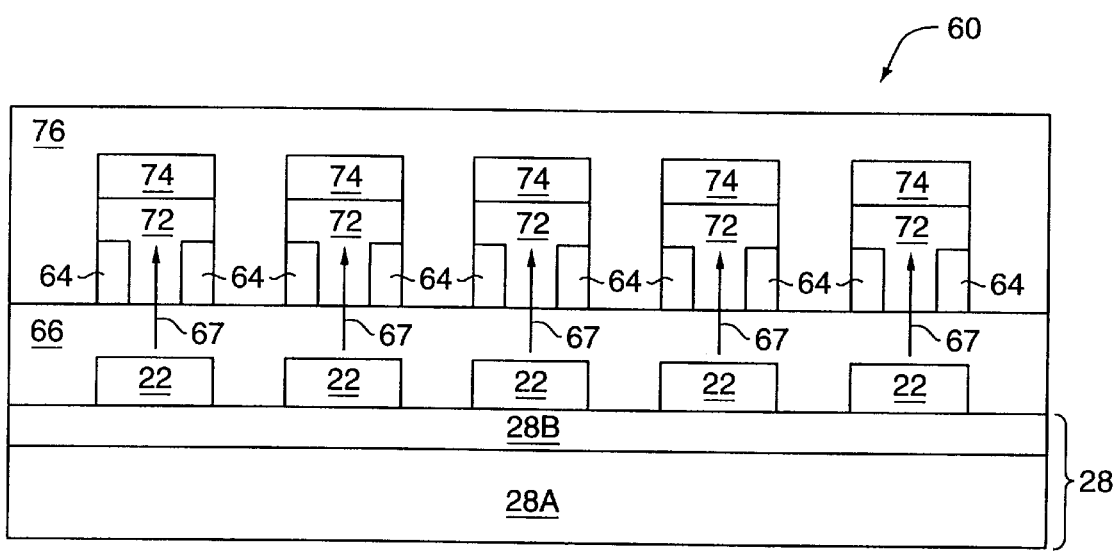
FIG. 10 shows an alternative embodiment of a luminescent display in which luminescent layers and accelerator electrodes are formed directly upon the second electrodes and ferroelectric thin films, rather than being formed on a second substrate.

In FIG. 10 is shown an alternative embodiment in which phosphor layers 72 and accelerator electrodes 74 are formed directly upon second electrodes 64 and ferroelectric thin film 66, rather than being formed on a second substrate. A transparent glass layer or other dielectric encapsulating layer 76 is then deposited. Accordingly, the flat panel display 60 of FIG. 10 is highly integrated because all of the layers are formed on a single substrate. The display 60 of FIG. 10 also does not require a vacuum. It is understood that the ferroelectric thin film 66 may be etched away between the pixel electrodes, as shown with respect to ferroelectric thin films 26 in FIG. 9.

Figure 11:
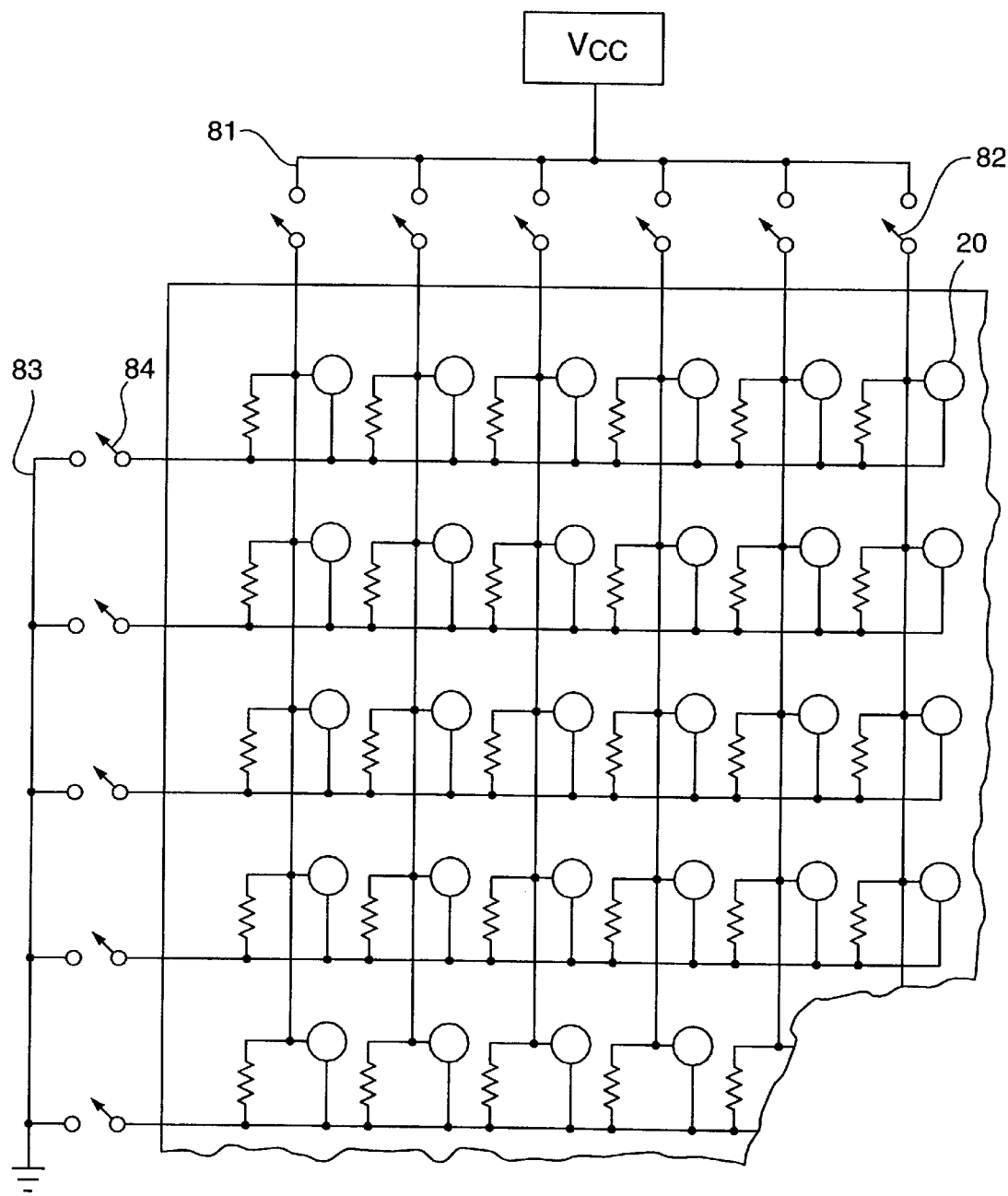
FIG. 11 shows a diagram of a row/column switch matrix array for a flat panel display.

FIG. 11 shows a diagram of a row/column switch matrix array for flat panel displays 50, 60. This switch has columns 81 with switches 82 and rows 83 with switches 84. Switches 82 are in electrical contact with contact pads 42 (not shown), and switches 84 are in electrical contact with contact pads 44 (not shown). A ferroelectric display 50,60, for example, may be energized by its voltage source by use of a single switch for every column of electron emitters and a single switch for every row of electron emitters. In the control scheme shown, an entire column of electrodes is selected simultaneously. The column is selected by closing the ground path to voltage source $V_{cc}$ for that column using the corresponding switch 82. The electron emitter associated with an individual pixel 20 in the selected column is energized by closing the ground path for the appropriate row using the corresponding switch 84. Resistors are placed between the two conductive electrodes on the surfaces of the ferroelectric thin film 26. This allows the charge on the capacitance of the ferroelectric to drain between times when that row is driven. This switching mechanism allows several methods of electron modulation including pulse width, amplitude and pulse number.

Ferroelectrics can emit electrons with significant kinetic energy. To optimize a given display system, it is necessary to adjust the emitted electron energy for a given phosphor. In an emissive ferroelectric display, this energy can be influenced by modifying various geometric parameters. Electrons emitted from a ferroelectric surface are believed to derive their energy from the electric field developed by the interaction of the uncompensated charge developed on the surface and the system geometry. In the display system described, the resultant uncompensated surface charge density can be dependent on the driving pulse material type, initial polarization state of the material, and other factors. These parameters are difficult to control independently. Thus, for display purposes, to easily modify the electric field resulting from the uncompensated charge and therefore the electric energy, it may be more practical to modify the system geometry. The emission energy can be modified by changing the geometry both longitudinally and transversely with respect to the electron flow path. In an electrode system comprising a first electrode, a thin film of layered superlattice material, a vacuum gap, and an accelerating electrode, as the accelerating electrode is moved closer to the emitter surface, the energy of an emitted electron decreases. This is because an electric field exists between the emitter and the accelerating electrode. The energy of an emitted electron is proportional to the electric field times the distance traversed in the field. As the longitudinal spacing is decreased, the electron energy decreases. The second, front (or top) electrode is typically patterned to define the pixel and to allow electrons to escape from the surface of the ferroelectric thin film. An effect of the front electrode is to define the normal component of the electric field along an axis transverse to the direction of electron propagation. By patterning the electrode to increase the exposed surface area transverse to the electron flow path, it is possible to increase the number of emitted electrons and, thereby, the emission energy.

Figure 12:
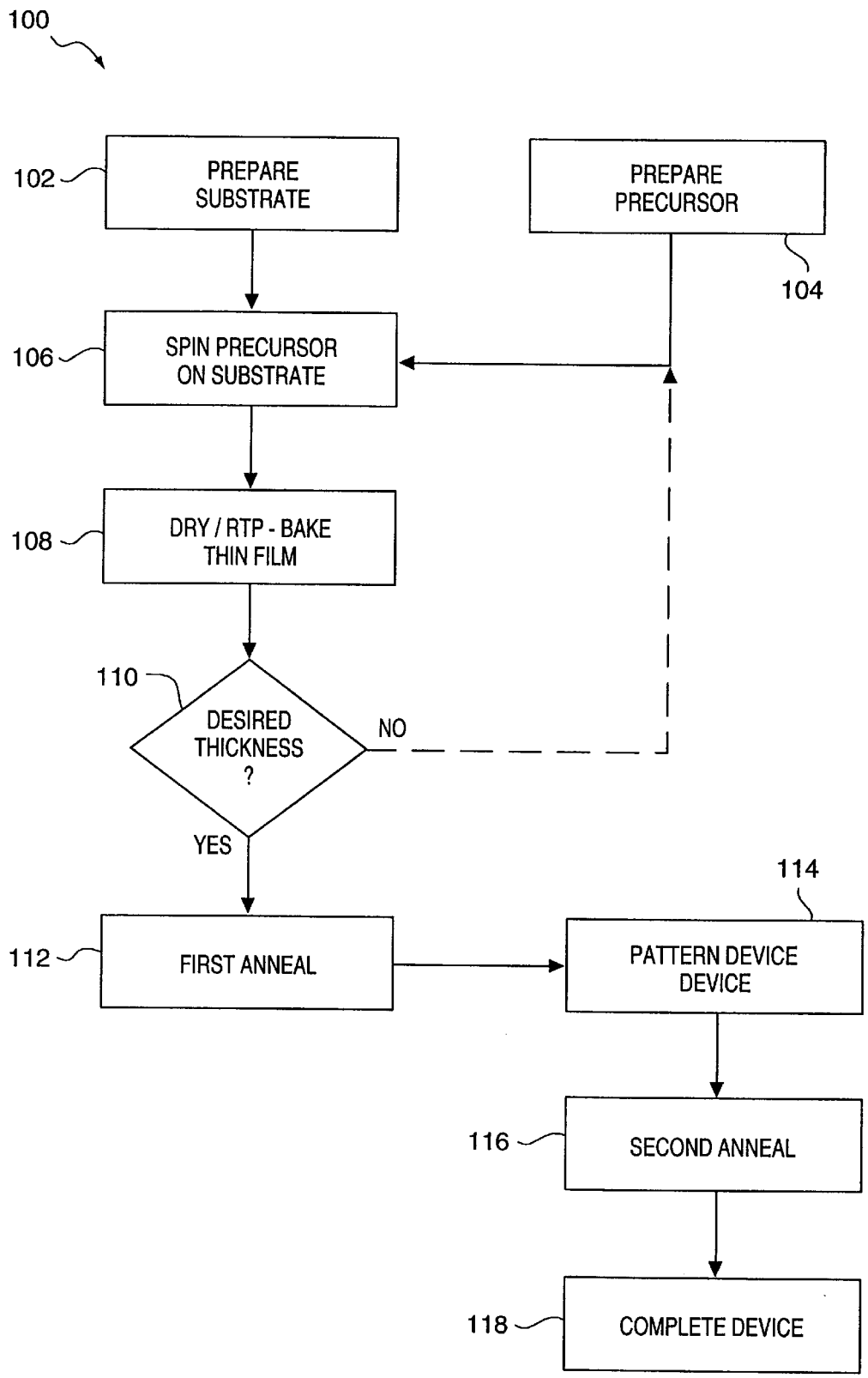
FIG. 12 depicts a flow chart of a generalized process according to the present invention for forming a thin film of layered superlattice material in a ferroelectric element of an optical flat panel display.

FIG. 12 depicts a flow chart of a generalized process 100 according to the present invention for providing an active-matrix luminescent flat panel display comprising a thin film of layered superlattice material as a ferroelectric electron emitter. With the exception of the thin layer of layered superlattice material, the structure and fabrication methods of luminescent displays with electron emitters are known in the art; therefore, they will not be discussed in detail here.

In step 102 the substrate 28 is prepared using conventional methods. The final precursor is prepared in step 104 as described in the discussion above with reference to FIG. 1. In step 106, the mixed, distilled, and adjusted precursor solution from step 104 is applied to the substrate from step 102, which presents the uppermost surfaces of electrodes 22 for receipt of thin film ferroelectric layer 26. Alternatively, the precursor is applied to unpatterned electrode layer 22, so that multiple layers are later patterned together. Preferably the precursor is applied by a spin-on process. The preferred precursor solution concentration is 0.01 to 0.50 M (moles/liter), and the preferred spin speed is between 500 rpm and 5000 rpm. Application of the liquid precursor is preferably conducted by dropping one to two ml of the final liquid precursor solution at ambient temperature and pressure onto the uppermost surface of electrodes 22 and then spinning substrate 28 at up to about 2000 RPM for about 30 seconds to remove any excess solution and leave a thin-film liquid residue. The most preferred spin velocity is 1500 RPM. Alternatively, the liquid precursor may be applied by a misted deposition technique or chemical vapor deposition.

In steps 108 and 112, the precursor is thermally treated to form a solid metal oxide having a layered superlattice structure. This thermal treatment is conducted by drying and baking a liquid precursor film that results from step 106. The spin-on process and the misted deposition process remove some of the solvent, but some solvent remains after the coating. This solvent is removed from the wet film in a drying step 108. At the same time, the drying causes thermal decomposition of the organic elements in the thin film, which also vaporize and are removed from the thin film. This results in a solid thin film of the layered superlattice material 26 in a precrystallized amorphous state. This dried film is sufficiently rigid to support the next spin-on coat. The drying temperature must be above the boiling point of the solvent, and preferably above the thermal decomposition temperature of the organics in precursor solution. The preferred drying temperature is between 150 ° C. and 500° C. and depends on the specific precursor used. The drying step may comprise a single drying step at a single temperature, or multiple step drying process at several different temperatures, such as a ramping up and down of temperature. The multiple step drying process is useful to prevent cracking and bubbling of the thin film which can occur due to excessive volume shrinkage by too rapid temperature rise. An electric hot plate is preferably used to perform the drying step 108. In step 108, the precursor is dried on a hot plate in a dry air atmosphere and at a temperature of from about 150° C. to 500° C. for a sufficient time duration to remove substantially all of the organic materials from the liquid thin film and leave a dried metal oxide residue. This period of time is preferably from about one minute to about thirty minutes. A 400° C. drying temperature for a duration of about two to ten minutes in air is most preferred. This drying step is essential in obtaining predictable or repeatable electronic properties in the final crystalline compositions of layered superlattice material to be derived from process 100.

In step 110, if the resultant dried precursor residue from step 108 is not of the desired thickness, then steps 106 and 108 are repeated until the desired thickness is obtained. The thickness of a single coat, via the spin process or otherwise, is very important to prevent cracking due to volume shrinkage during the following heating steps 108, 112, and 116. To obtain a crack-free film, a single spin-coat layer should be less than 2000 Å(200 nanometers) after the drying step 108. Therefore, multiple coating is necessary to achieve film thicknesses greater than 2000 Å. A thickness of about 1800 Å typically requires two coats of a 0.130M solution under the parameters disclosed herein.

The drying step 108 optionally includes an RTP (rapid thermal processing) bake step. Radiation from a halogen lamp, an infrared lamp, or an ultraviolet lamp provides the source of heat for the RTP bake step. Preferably, the RTP bake is performed in an oxygen atmosphere of between 20% and 100% oxygen, at a temperature between 450° C. and 725° C., and preferably 700° C., with a ramping rate between 1° C./sec and 200° C./sec, and with a holding time of 5 seconds to 300 seconds. Any residual organics are burned out and vaporized during the RTP process. At the same time, the rapid temperature rise of the RTP bake promotes nucleation, i.e. the generation of numerous small crystalline grains of the layered superlattice material in the solid film 26. These grains act as nuclei upon which further crystallization can occur. The presence of oxygen in the bake process is essential in forming these grains. The preferred film fabrication process includes RTP baking for each spin-on coat. As shown in FIG. 12, the substrate 28 is coated, dried, and RTP baked, and then in step(s) 110 the process is repeated as often as necessary to achieve the desired thickness. However, the RTP bake step is not essential for every coat. One RTP bake step for every two coats is practical, and even just one RTP bake step at the end of a series of coats is strongly effective in improving the electronic properties of most layered superlattice ferroelectrics. For a limited number of specific precursor/layered superlattice material compositions, particularly ones utilizing concentrations of bismuth in excess of stoichiometry, the RTP bake step is not necessary.

Once the desired film thickness has been obtained, the dried and preferably baked film is annealed in step 112 to form the thin film 26 of ferroelectric layered superlattice material. The annealing step 112 is referred to as a first anneal to distinguish it from subsequent anneals. The first anneal is preferably performed in an oxygen atmosphere in a furnace. The oxygen concentration is preferably 20% to 100%, and the temperature is above the crystallization temperature of the particular layered superlattice material 26. The first anneal is preferably performed in oxygen at a temperature of from 500° C. to 1000° C. for a time from 30 minutes to 2 hours. Step 112 is more preferably performed at from 750° C. to 850° C. for 80 minutes, with the most preferred anneal temperature being about 800° C. The indicated anneal times include the time that is used to create thermal ramps into and out of the furnace. The first anneal of step 112 most preferably occurs in an oxygen atmosphere using an 80 minute push/pull process including 5 minutes for the "push" into the furnace and 5 minutes for the "pull" out of the furnace. In some fabrication cases, to prevent evaporation of elements from the layered superlattice material 26 and to prevent thermal damage to the substrate including damage to display elements already in place, it may be necessary to use a low-temperature anneal not exceeding 700° C. Low-temperature annealing of strontium bismuth tantalum niobate is done at about 700° C. for five hours, and is in a similar range for most other layered superlattice materials. If five hours is too long for a particular flat panel device, then the low-temperature first anneal may be reduced. However, less than 3 hours of annealing at 700° C results in unsaturated hysteresis loops. Three hours annealing provides adequate saturation, and additional annealing increases the polarizability, 2Pr. Again, the presence of oxygen is important in this first anneal step. The numerous small grains generated by the RTP bake step grow, and a wellcrystallized ferroelectric film is formed under the oxygen-rich atmosphere.

Rapid thermal processing (RTP), described above with reference to the optional RTP-bake in step 108, may be substituted for either or both of the conventional drying process in step 108 and the furnace anneal in step 112. Generally, this procedure includes the use of ultraviolet radiation ("UV") from a conventional radiation source, such as a deuterium lamp, as a substitute for the diffusion furnace or the hot plate. Even so, it is still preferred to conduct such heating in an oxygen atmosphere for purposes of compensating possible oxygen deficiency sites in the layered superlattice materials. The application of UV light during the drying and/or first annealing steps can serve to promote crystalline growth of layered superlattice materials with a mixed orientation. Thus, superlattice materials formed from these RTP-derived oriented crystals exhibit superior electrical performance. Other thermal treating options may comprise exposing the liquid thin film to a vacuum for drying in step 108, or a combination of furnace-annealing and RTP-annealing procedures.

In step 114, the second electrode 114 is deposited, usually by sputtering, on ferroelectric thin film 26 of display elements 50, 60. The device is then patterned by a conventional photoetching process including the application of a photoresist followed by ion etching, as will be understood by those skilled in the art. This patterning preferably occurs before the second annealing step 116 so that the second anneal will serve to remove patterning stresses from flat panel displays 50,60 and correct any defects that are created by the patterning procedure. In step 118 the device is completed using conventional methods, which step may include depositing luminescent layer 32, accelerator electrode 34, and encapsulating layer 56, as well as joining second substrate 36 to substrate 28.

Figure 13:
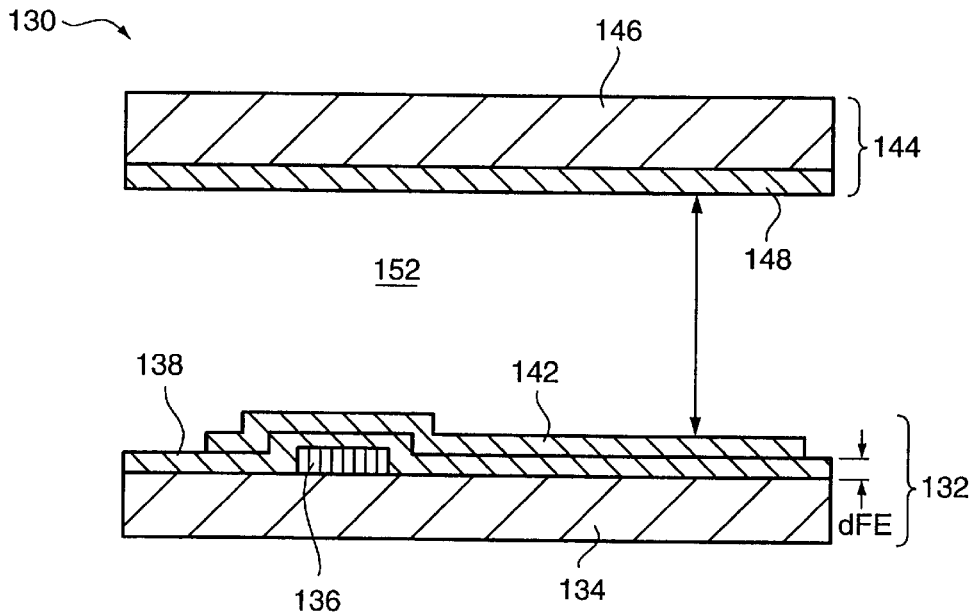
FIG. 13 is a cross-sectional illustration of a pixel portion of an optical display containing liquid crystal material and a ferroelectric matrix driving element comprising layered superlattice material according to the invention.
Figure 14:
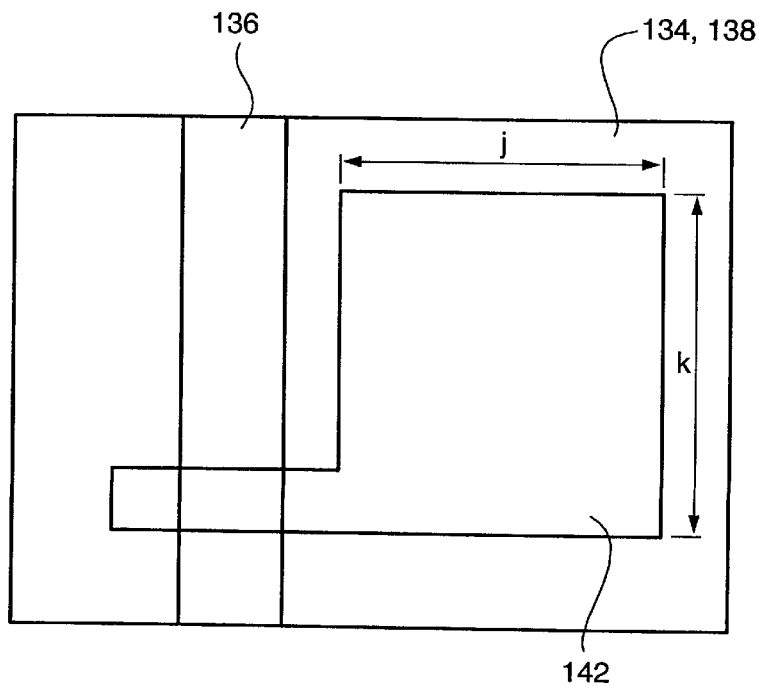
FIG. 14 is a top view of the bottom substrate of the optical display depicted in FIG. 13.

In FIG. 13, still another embodiment of the invention is shown in schematic form. FIG. 13 shows a sectional view of a one-pixel portion 130 of an active matrix type LCD (liquid crystal display) using ferroelectric layered superlattice material as an active portion of the driving device. FIG. 14 is a top view of a bottom substrate 132. The bottom substrate 132 is constituted as follows. An image electrode 136, which receives image information, is formed on a portion of glass substrate 134. Since most LCDs utilize backlighting, the image electrode comprises a transparent conductor, such as indium tin oxide (ITO) or antimony tin oxide. A ferroelectric thin film 138 comprising layered superlattice material is formed over image electrode 136 and glass substrate 134. Further, a pixel electrode 142 of transparent metal is formed over portions of image electrode 136 and ferroelectric thin film 138. A top substrate 144 comprises a glass substrate 146 and a scanning electrode 148 made of a transparent metal and formed on glass substrate 146. A liquid crystal layer 152 is interposed between bottom substrate 132 and top substrate 144 to constitute a single pixel portion of a liquid crystal display.

Figure 15:
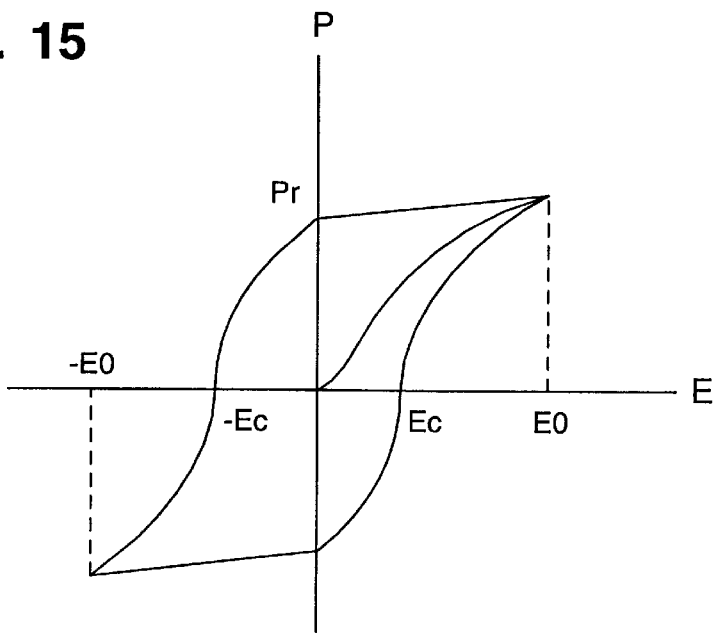
FIG. 15 shows the graph of a typical ferroelectric hysteresis curve in which electric field strength, E (e.g., in units of kV/cm) is represented on the horizontal axis, and charge density, P (e.g., in units of pC/cm$^2$) is represented on the vertical axis.

The charge density characteristics of ferroelectric layered superlattice material as a function of electric field are described with reference to FIG. 15. In the graph of a typical ferroelectric hysteresis curve in FIG. 15 electric field strength, E (e.g., in units of kV/cm) is represented on the horizontal axis, and charge density, P (e.g., in units of $\mu C/cm^2$) is represented on the vertical axis. The charge density P increases as the electric field density is increased. After application of an electric field $E_o$ to the ferroelectric material, the polarization reaches a corresponding saturation level, Ps. When the field is decreased to zero level, a remanent polarization, Pr, remains in the material. Similarly, a remanent polarization, −Pr, in the opposite sense can be created in the ferroelectric material by applying an electric field, $-E_o$, in the opposite sense. The remanent polarization, Pr, is reduced to zero by applying an electric field with opposite polarity called the coercive field, −Ec. Similarly, the remanent polarization, −Pr, is reduced to zero by applying an electric field with opposite polarity, −Ec. As a result of remanent polarization in the ferroelectric layered superlattice material, an electric field is exerted on the volume surrounding the material. The electric field that develops in accordance with the remanent polarization Pr or −Pr can be applied to the liquid crystal material that is connected in series to the ferroelectric material. This results in a voltage being applied across the liquid crystal layer 152.

Figure 16:
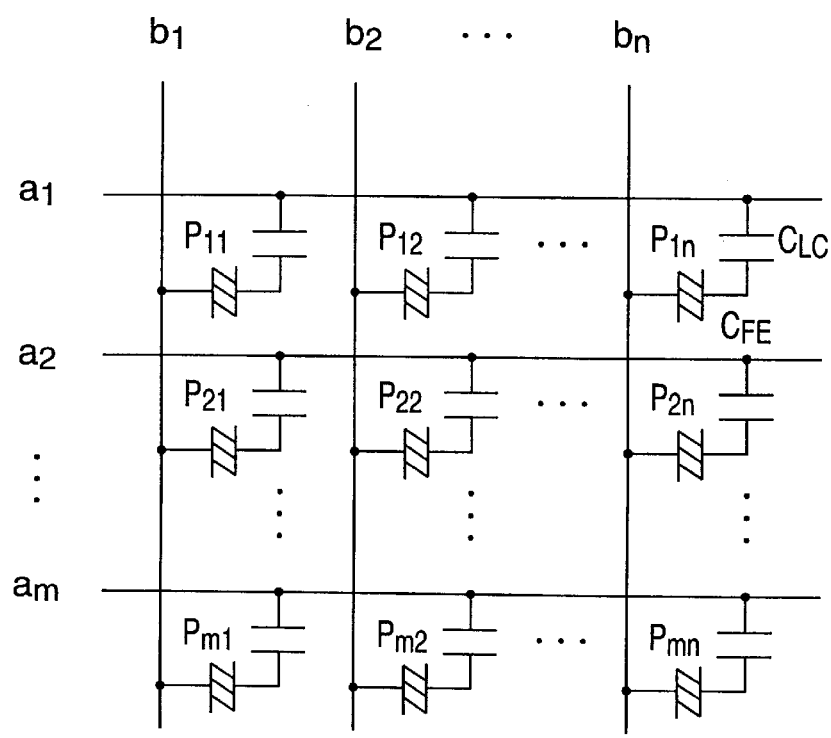
FIG. 16 shows a diagram of a row/column switch matrix array for a liquid crystal flat panel display containing ferroelectric matrix driving elements.

FIG. 16 shows an equivalent circuit of a matrix of array of liquid crystal pixels arranged in columns and rows. Symbol $P_{mn}$ represents a pixel element comprising a series connection of a capacitance component $C_{LC}$ of liquid crystal layer 152 adjacent to both of pixel electrode 142 and scanning electrode 148 (portion of j ×k in FIG. 14) and a capacitance component $C_{FE}$ of ferroelectric layered superlattice material thin film 138. Scanning electrodes of the respective rows of pixels $P_{11}-P_1n$, $P_{m1}-P_{mn}$ are connected by scanning lines $a_1-a_m$. Image electrodes of the respective columns of pixels $P_{11}-P_{m1}$, $P_{1n}-P_{mn}$ are connected by image lines $b_1-b_n$. As is known in the art, an individual pixel is turned on by supplying a predetermined voltage to the respective scanning line of the pixel, while supplying a different voltage to the other scanning lines, and by supplying a predetermined voltage to the respective image line of the pixel, while supplying a different voltage to the other image lines. The voltage $V_{FE}$ across the ferroelectric layered superlattice material thin film 138 is a function of the applied scanning and image voltages and of the capacitances $C_{FE}$ and $C_{LC}$. With the progress of the scanning operation, an internal, residual electric field remains in the ferroelectric thin film 138 due to the remanent polarization Pr corresponding to the applied voltage $V_{FE}$. The internal electric field causes a voltage $V_{REM}$, proportional to the voltage $V_{FE}$, to be applied to the liquid crystal layer 152. The optical effect of the remanent voltage $V_{REM}$ is to produce an electric field in the liquid crystal layer 152, thereby influencing the transmissivity of the liquid crystal layer 152 to light passing through it.

The ferroelectric layered superlattice material thin film 138 in the active matrix driver 130 of a liquid crystal display (LCD) as shown in FIG. 13 and FIG. 14 is produced in substantial accordance with the process flow sheet 100 of FIG. 12. With the exception of the thin film 138 of layered superlattice material, the structure and fabrication methods of ferroelectric active-matrix driving elements are known in the art. See, for example, William C. O'Mara, *Liquid Crystal Flat Panel Displays*, Chapman & Hall (1993), which is hereby incorporated by reference, as if fully contained herein. Therefore, they will not be discussed in detail here. Also, the ferroelectric layered superlattice thin films in both a ferroelectric electron emission luminescent display 20, 50, 60 and in an active matrix driving device 130 of a liquid crystal display are prepared similarly. The discussion above in reference to FIG. 12 with respect to the preparation of the ferroelectric thin film, therefore, will not be repeated.

With respect to a ferroelectric driving element 130 in a liquid crystal display, in step 102 of process 100 of FIG. 12, glass substrate 134 is prepared using conventional methods. In step 102, a chromium film is applied, and image electrode 136 is formed by a usual photolitho-etching technique. In step 104 a liquid precursor of layered superlattice material is prepared as outlined above with reference to FIG. 1. In step 106 the mixed, distilled, and adjusted precursor solution from step 104 is applied over the entire surface of substrate 134 and image electrodes 136. Alternatively, the precursor is applied to an unpatterned image electrode layer 136, so that multiple device layers are later patterned together.

The precursor is prepared and preferably applied in a spin-on process as described above in reference to FIG. 12. The resulting film is also dried, baked and annealed as described above.

In step 114, the pixel electrode 142 is deposited, usually by sputtering, on ferroelectric thin film 138 of display element 130. Preferably, pixel electrode 142 is deposited using a liquid or vapor deposition method to avoid damage or contamination of ferroelectric thin film 138. The device is then patterned by a conventional photoetching process including the application of a photoresist followed by ion etching, as will be understood by those skilled in the art. This patterning preferably occurs before the second annealing step 116 so that the second anneal will serve to remove patterning stresses from flat panel display 130 and correct any defects that are created by the patterning procedure. In step 118 the device is completed using conventional methods, which step includes, among others, formation of substrate 144 and inclusion of liquid crystal layer 152.

There has been described a structure and fabrication methods of ferroelectric elements of flat panel displays. It should be understood that the particular embodiments shown in the drawings and described within this specification are for purposes of example and should not be construed to limit the invention which will be described in the claims below. For example, the invention contemplates that the ferroelectric thin films described in the specification and discussed with reference to FIGS. 1–16 may be made of any layered superlattice material. Further, it is evident that those skilled in the art may now make numerous uses and modifications of the specific embodiments described, without departing from the inventive concepts. It is also evident that the steps recited may in some instances be performed in a different order. Or equivalent structures and process may be substituted for the various structures and processes described. Consequently, the invention is to be construed as embracing each and every novel feature and novel combination of features present in and/or possessed by the optical display devices, precursor preparation methods, and fabricating methods described.

I claim:

1. In an optical display device having an optical element that is selectively operable for optical effects by influence of a ferroelectric material, and a ferroelectric material located proximate said optical element for selective operation thereof, the improvement comprising:

said ferroelectric material being a layered superlattice material.

2. A display device as in claim 1 wherein said optical element comprises a luminescent material, said optical effect is the emission of light, and said layered superlattice material emits electrons that impinge upon said luminescent material to produce said optical effect.

3. A display device as in claim 2 comprising a thin film of said layered superlattice material with a thickness not exceeding 4000 Å (300 nanometers).

4. A display device as in claim 2 comprising a thin film of said layered superlattice material with a thickness not exceeding 1400 Å (140 nanometers).

5. A display device as in claim 1 wherein said optical element comprises a liquid crystal material, said optical effect is a change in transmissivity of light through said liquid crystal material, and said layered superlattice material exerts an electric field upon said liquid crystal material.

6. A display device as in claim 5 comprising a thin film of said layered superlattice material with a thickness not exceeding 4000 Å (300 nanometers).

7. A display device as in claim 5 comprising a thin film of said layered superlattice material with a thickness not exceeding 1400 Å (140 nanometers).

8. A display device as in claim 1 wherein said layered superlattice material comprises an excess amount of at least one of the elements selected from the group consisting of superlattice generator elements and B-site elements.

9. A display device as in claim 1 wherein said layered superlattice material comprises strontium bismuth tantalate, and at least one of the metals bismuth and tantalum is present in an excess amount.

10. A display device as in claim 1 wherein said layered superlattice material comprises strontium bismuth tantalum niobate, and at least one of the metals bismuth, tantalum and niobium is present in an excess amount.

11. A method for fabricating a ferroelectric device in an optical display comprising the steps of:

providing a substrate;

providing a precursor containing metal moieties in effective amounts for spontaneously forming a ferroelectric layered superlattice material upon drying and heating of said precursor;

applying said precursor to said substrate;

drying said precursor to form a dried material on said substrate;

heating said dried material at a temperature of between 500° C. and 1000° C. to yield a thin film of layered superlattice material containing said metal moieties on said substrate; and completing said ferroelectric device.

12. A method as in claim 11 wherein said optical display comprises a luminescent material.

13. A method as in claim 12 wherein said thin film of layered superlattice material has a thickness not exceeding 4000 Å (300 nanometers).

14. A method as in claim 12 wherein said thin film of layered superlattice material has a thickness not exceeding 1400 Å (140 nanometers).

15. A method as in claim 11 wherein said ferroelectric device comprises a liquid crystal material.

16. A method as in claim 15 wherein said thin film of layered superlattice material has a thickness not exceeding 4000 Å (300 nanometers).

17. A method as in claim 15 wherein said thin film of layered superlattice material has a thickness not exceeding 1400 Å (140 nanometers).

18. A method as in claim 11 wherein said precursor comprises an excess amount of at least one of the elements selected from the group consisting of superlattice generator elements and B-site elements.

19. A method as in claim 11 wherein said precursor comprises metal moieties in effective amounts for forming strontium bismuth tantalate.

20. A method as in claim 19 wherein said precursor comprises excess amounts of at least one of bismuth and tantalum.

21. A method as in claim 11 wherein said precursor comprises metal moieties in effective amounts for forming strontium bismuth tantalum niobate.

22. A precursor as in claim 21 wherein said precursor comprises excess amounts of at least one of bismuth, tantalum and niobium.

* * * * *

UNITED STATES PATENT AND TRADEMARK OFFICE
CERTIFICATE OF CORRECTION

PATENT NO : 5,943,111
DATED : August 24, 1999
INVENTOR(S) : Larry D. McMillan and Yasuhiro Shimada It is certified that error appears in the above-identified patent and that said Letters Patent is hereby corrected as shown below:

On title page, item 75 Inventor:
replace "Larry D. McMillan, Colorado Springs, Colo."
with --Larry D. McMillan, Colorado Springs, Colo.; Yasuhiro Shimada, Kyoto, Japan--.

Col. 23, line 25
replace "300 nanometers"
with --400 nanometers--.

Col. 23, line 36
replace "300 nanometers"
with --400 nanometers--.

Col. 24, line 22
replace "300 nanometers"
with --400 nanometers--.

Col. 24, line 30
replace "300 nanometers"
with --400 nanometers--.

Signed and Sealed this

Sixth Day of March, 2001

Attest:

NICHOLAS P. GODICI

Attesting Officer

Acting Director of the United States Patent and Trademark Office